INVENTOR.
WILLIAM R. SCHOLLE
BY Gary, Parker,
Juettner & Cullinan
ATTYS.

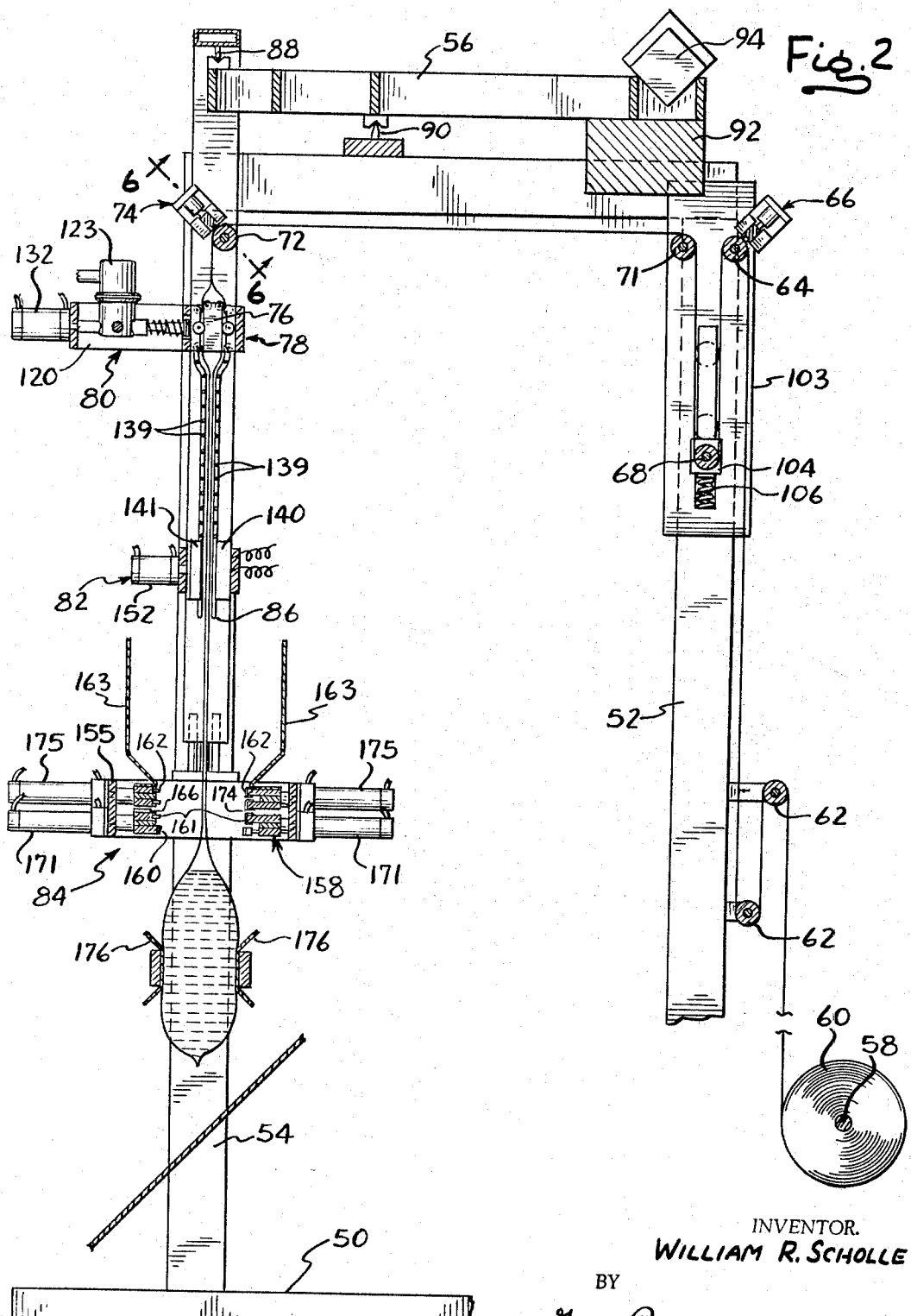

Aug. 8, 1967 W. R. SCHOLLE 3,334,466
PROCESS AND APPARATUS FOR CONTINUOUSLY FORMING
AND FILLING FLEXIBLE CONTAINERS
Filed Jan. 14, 1964 19 Sheets-Sheet 2
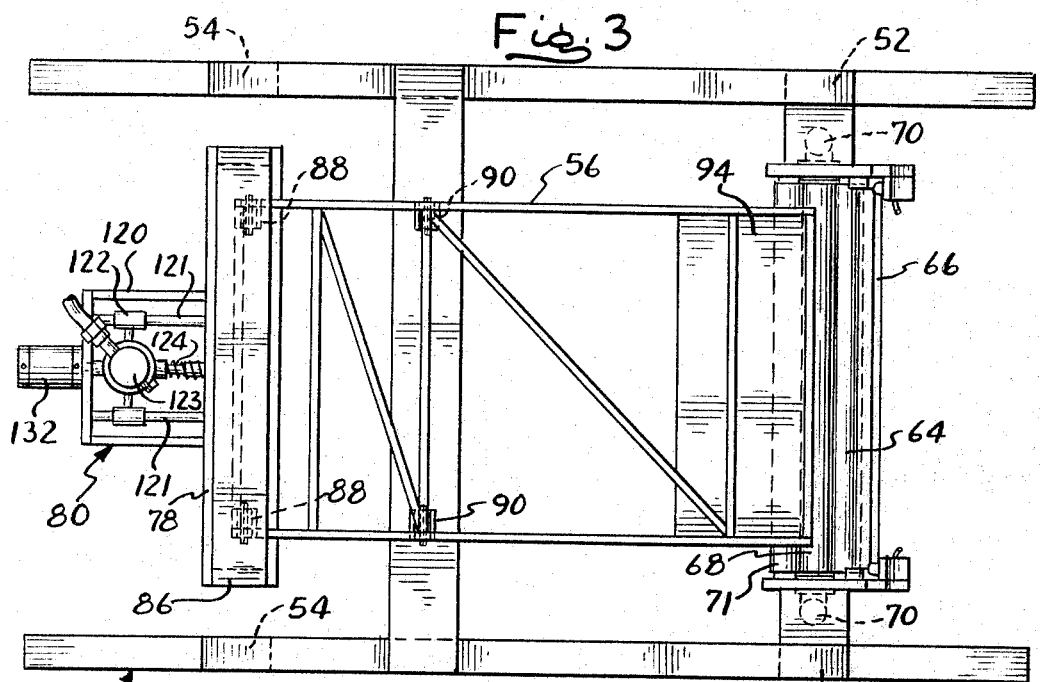
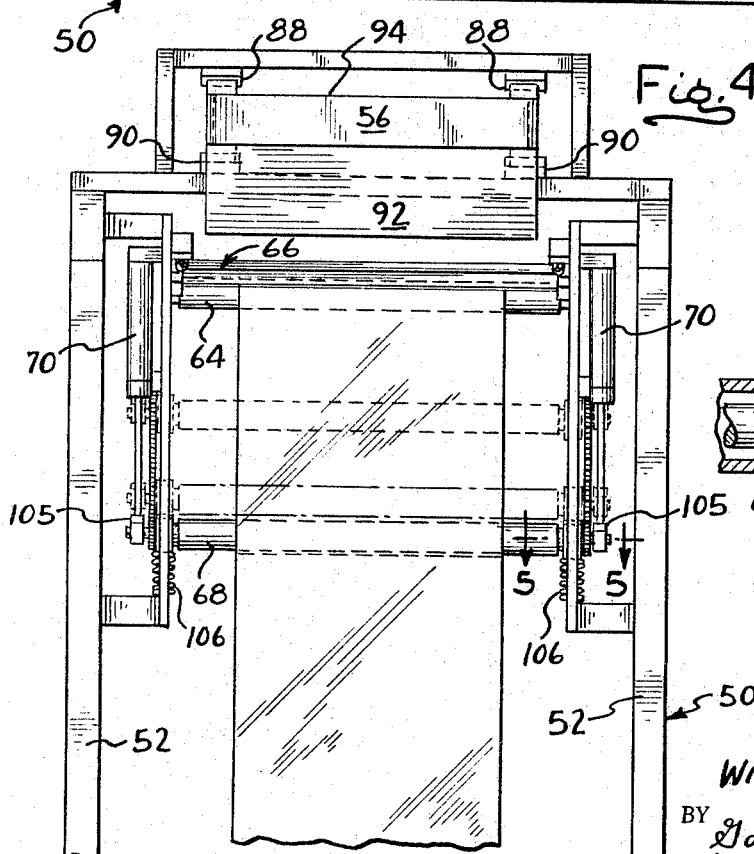
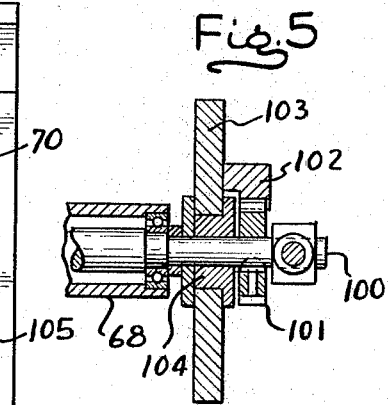
INVENTOR.
WILLIAM R. SCHOLLE
BY Gary, Parker,
Juettner & Cullinan
ATTYS.

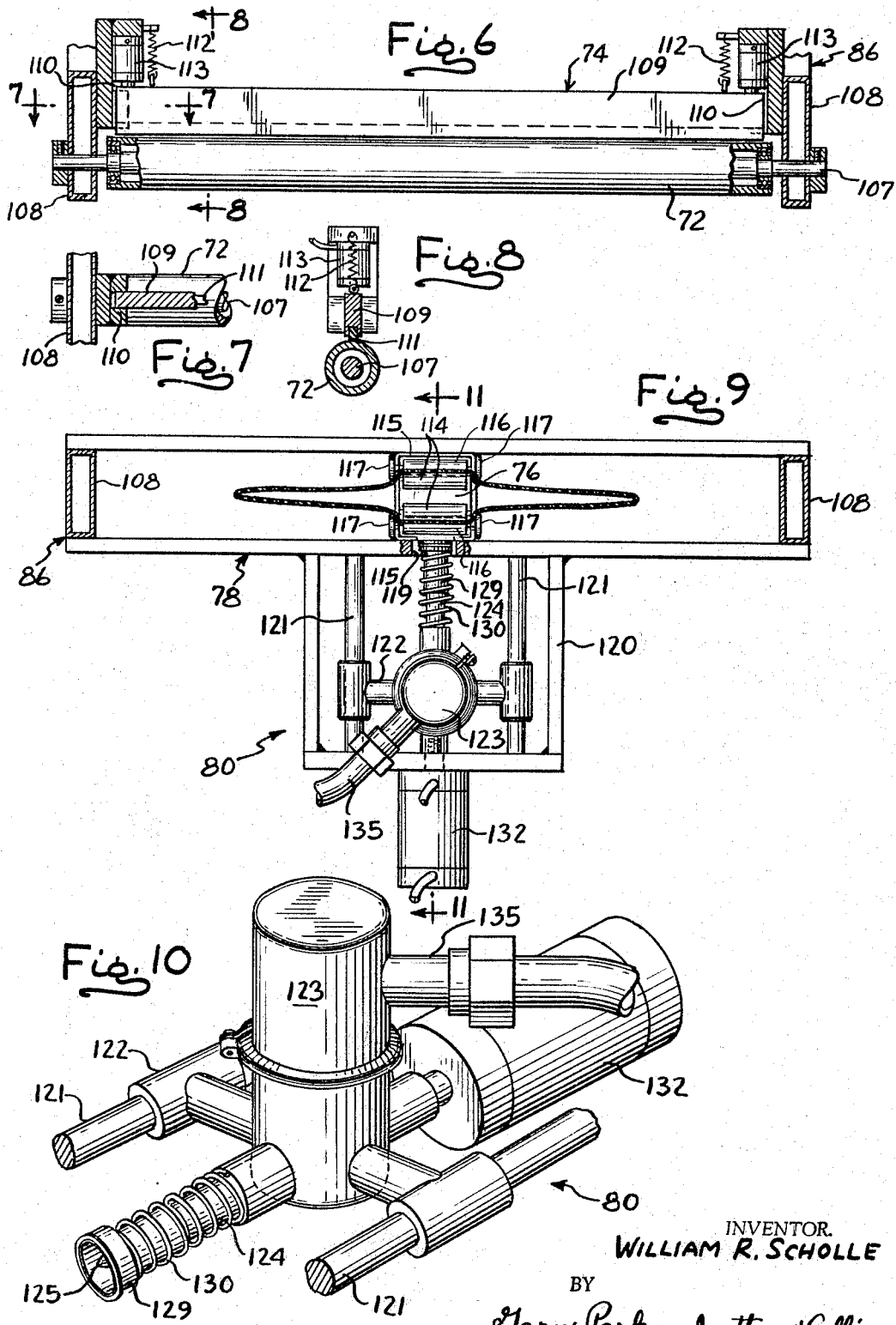

INVENTOR.
WILLIAM R. SCHOLLE
BY
Gary, Parker, Juettner & Cullinan
ATTYS.

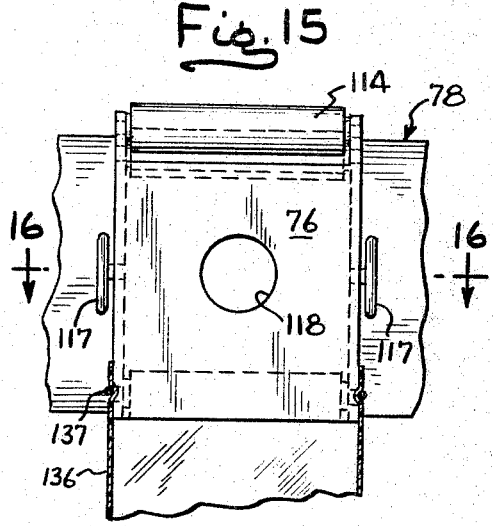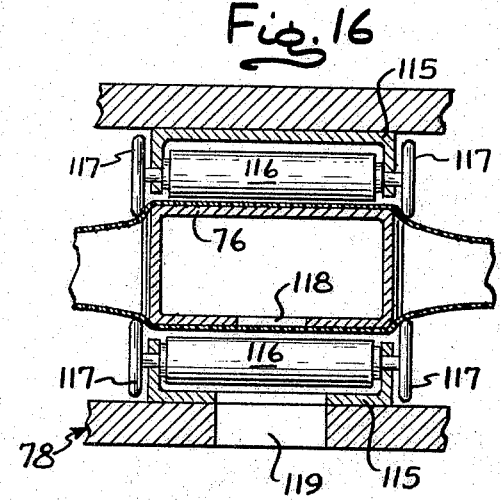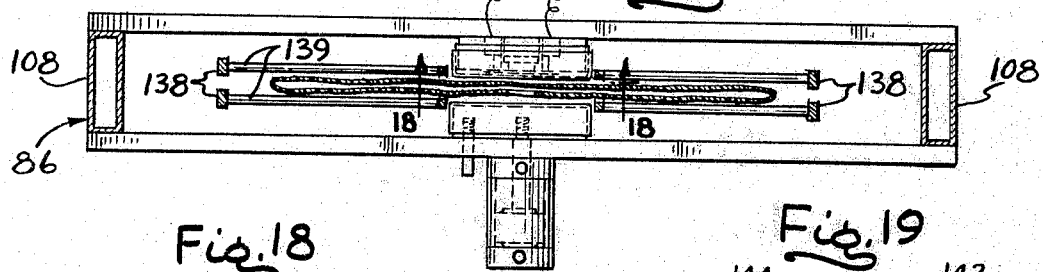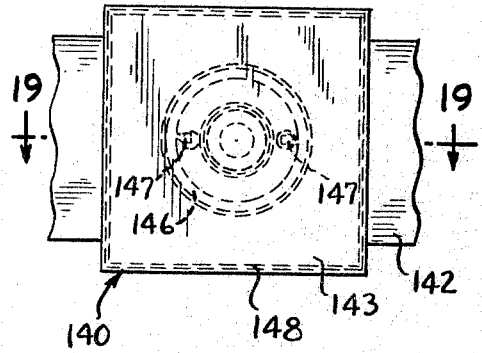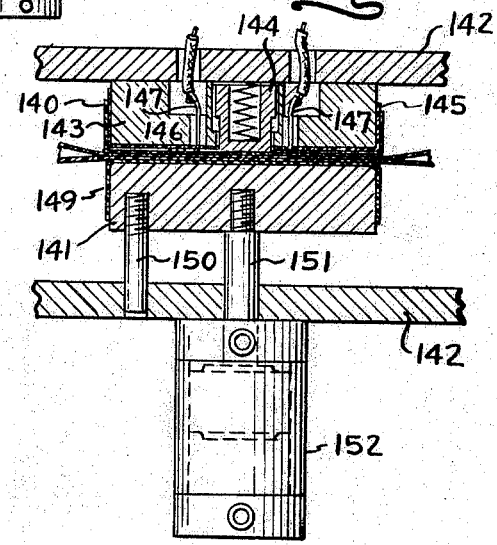

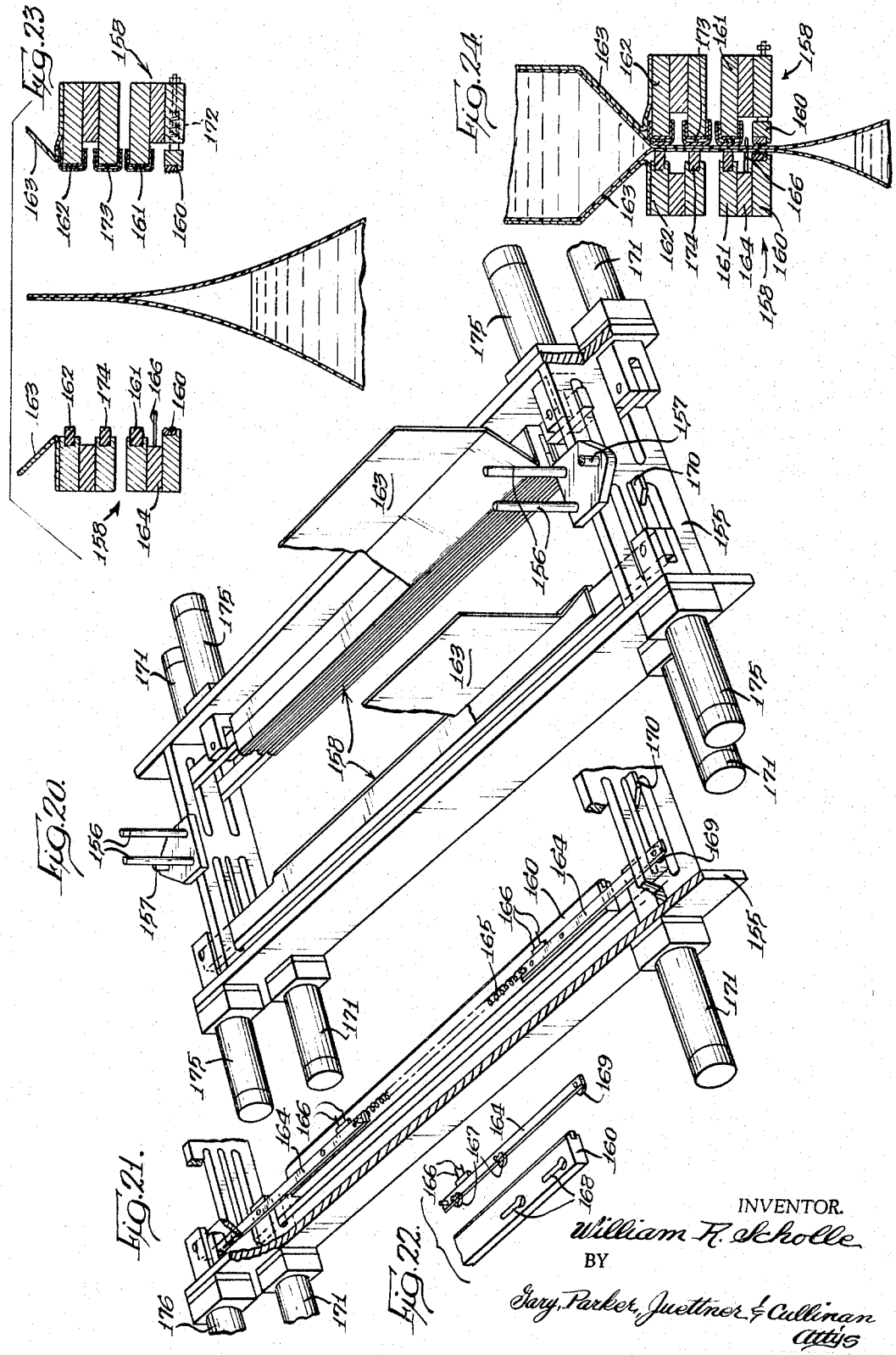

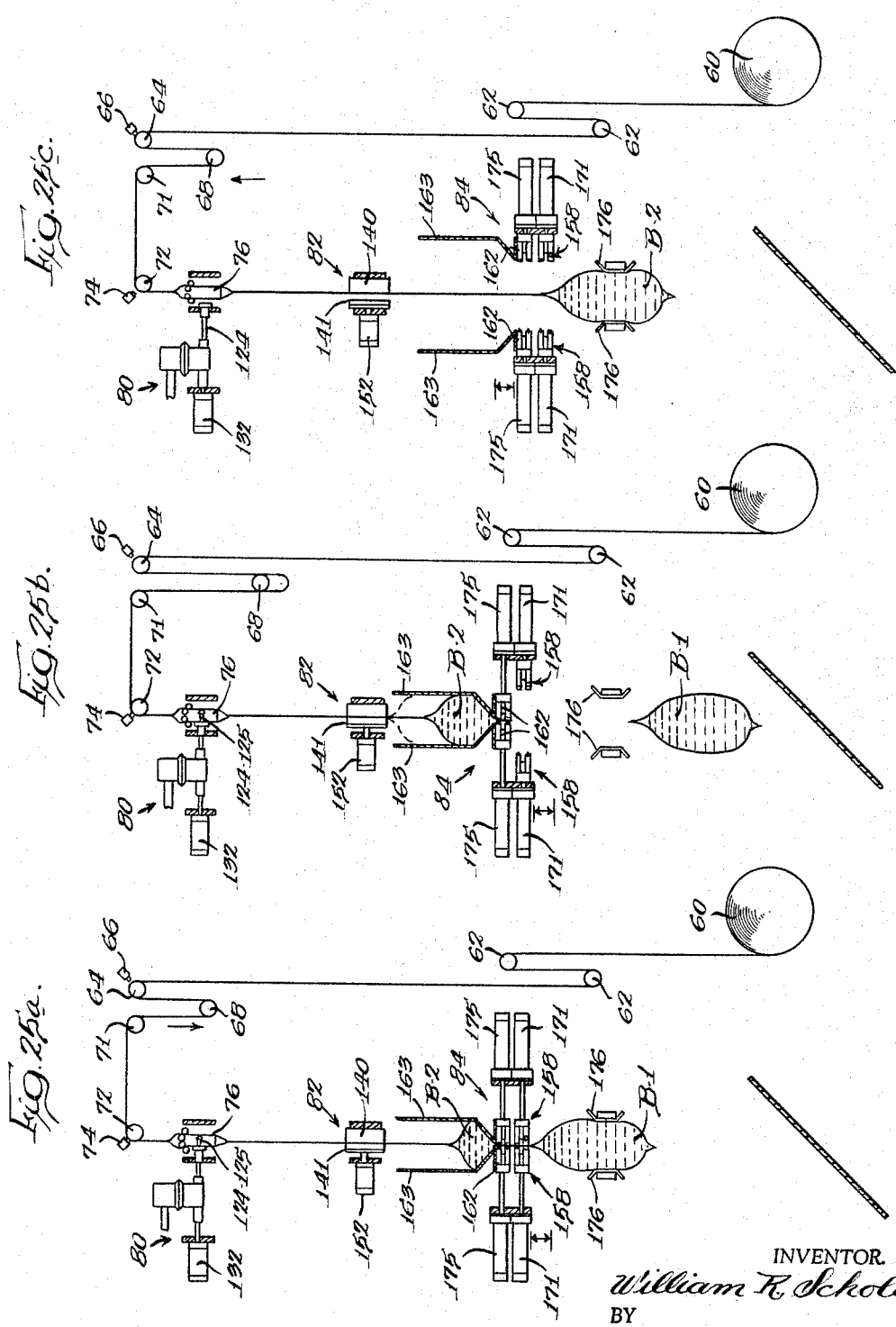

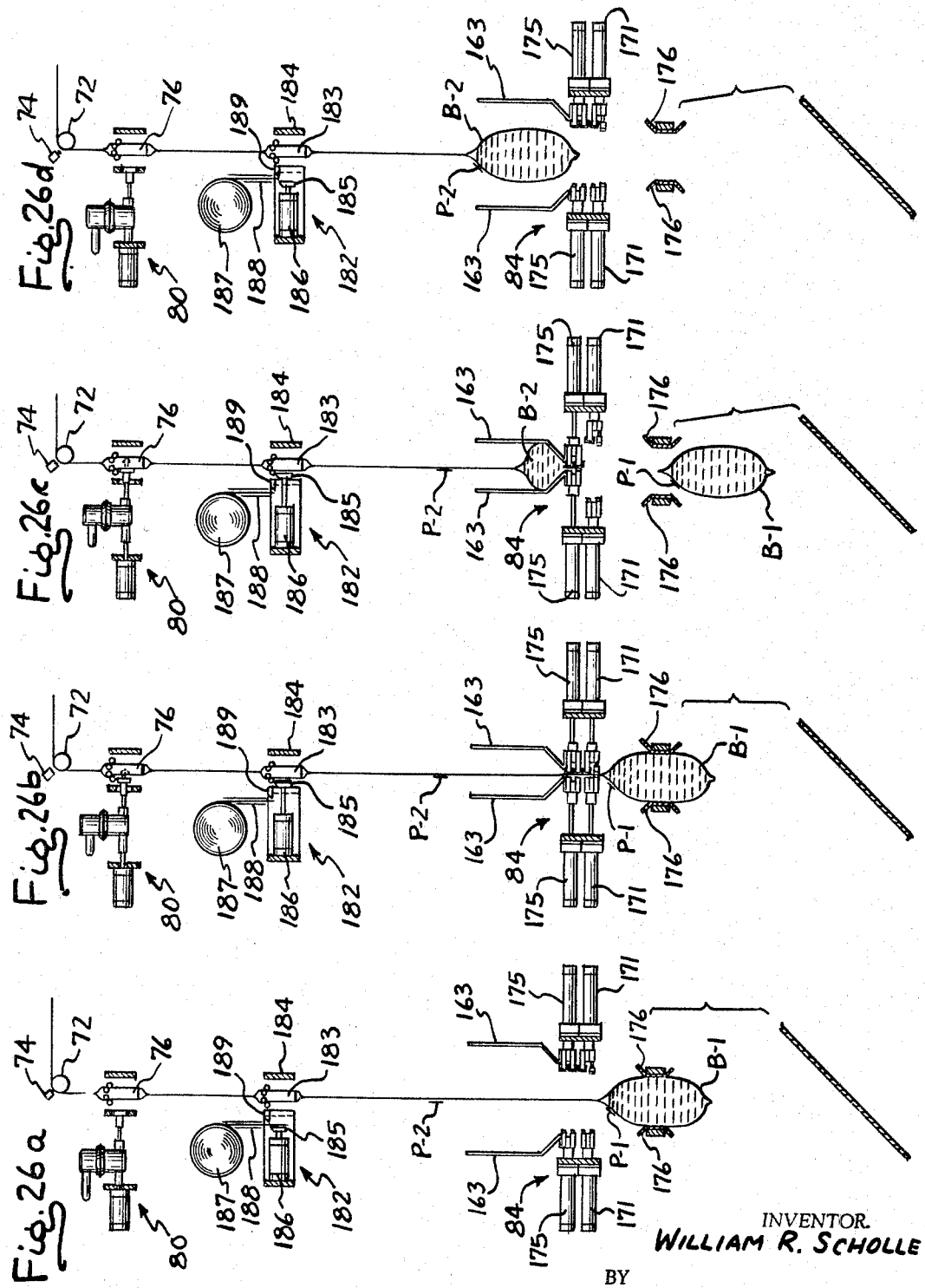

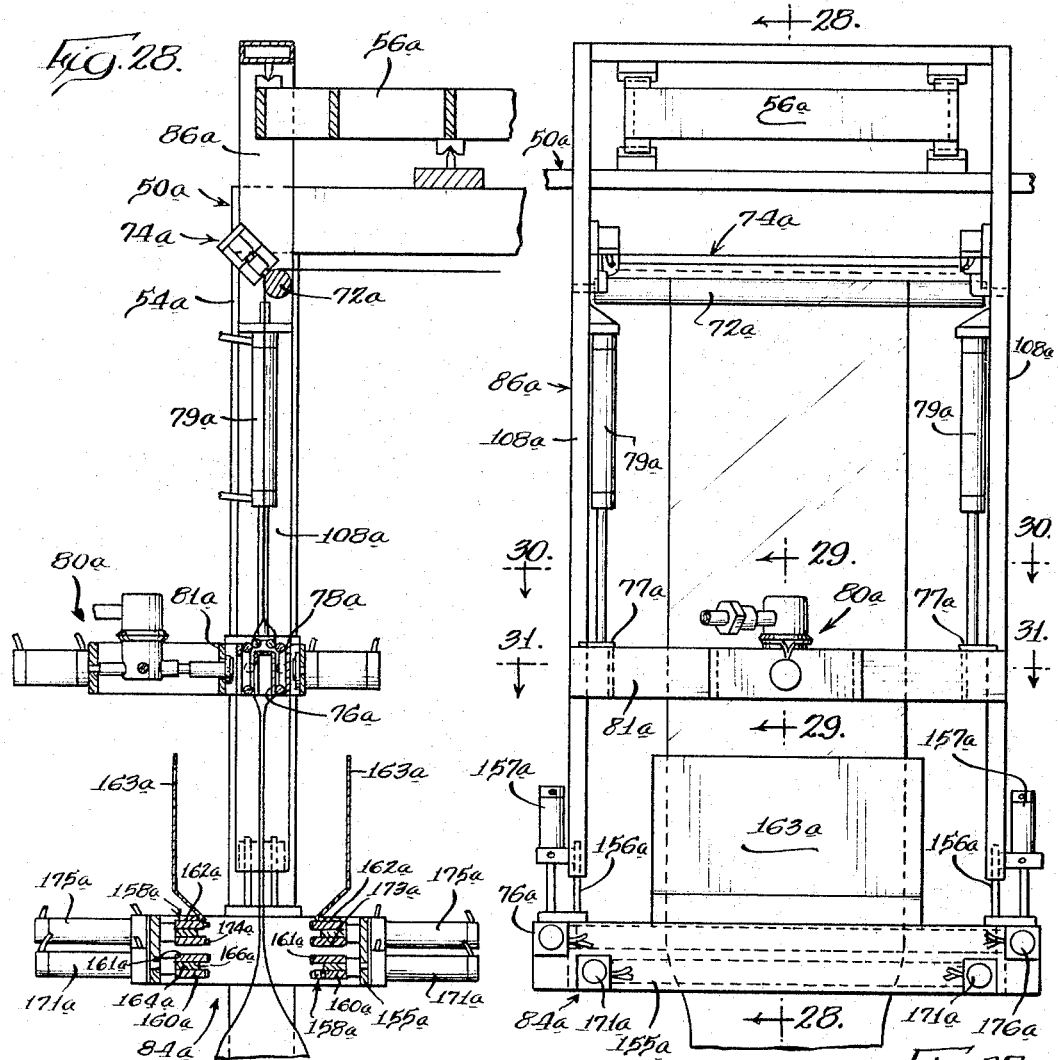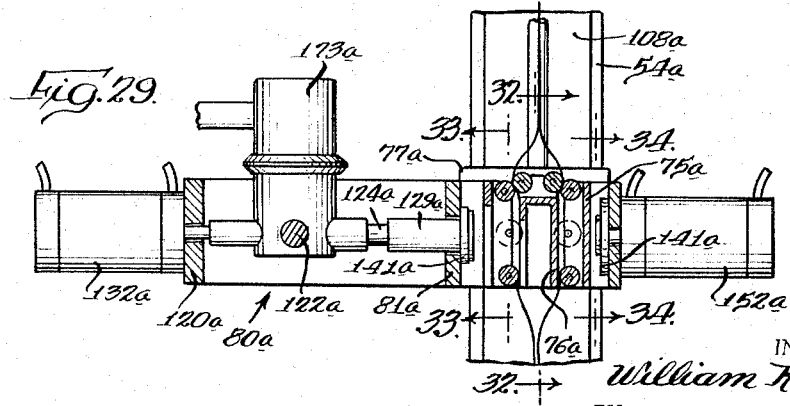

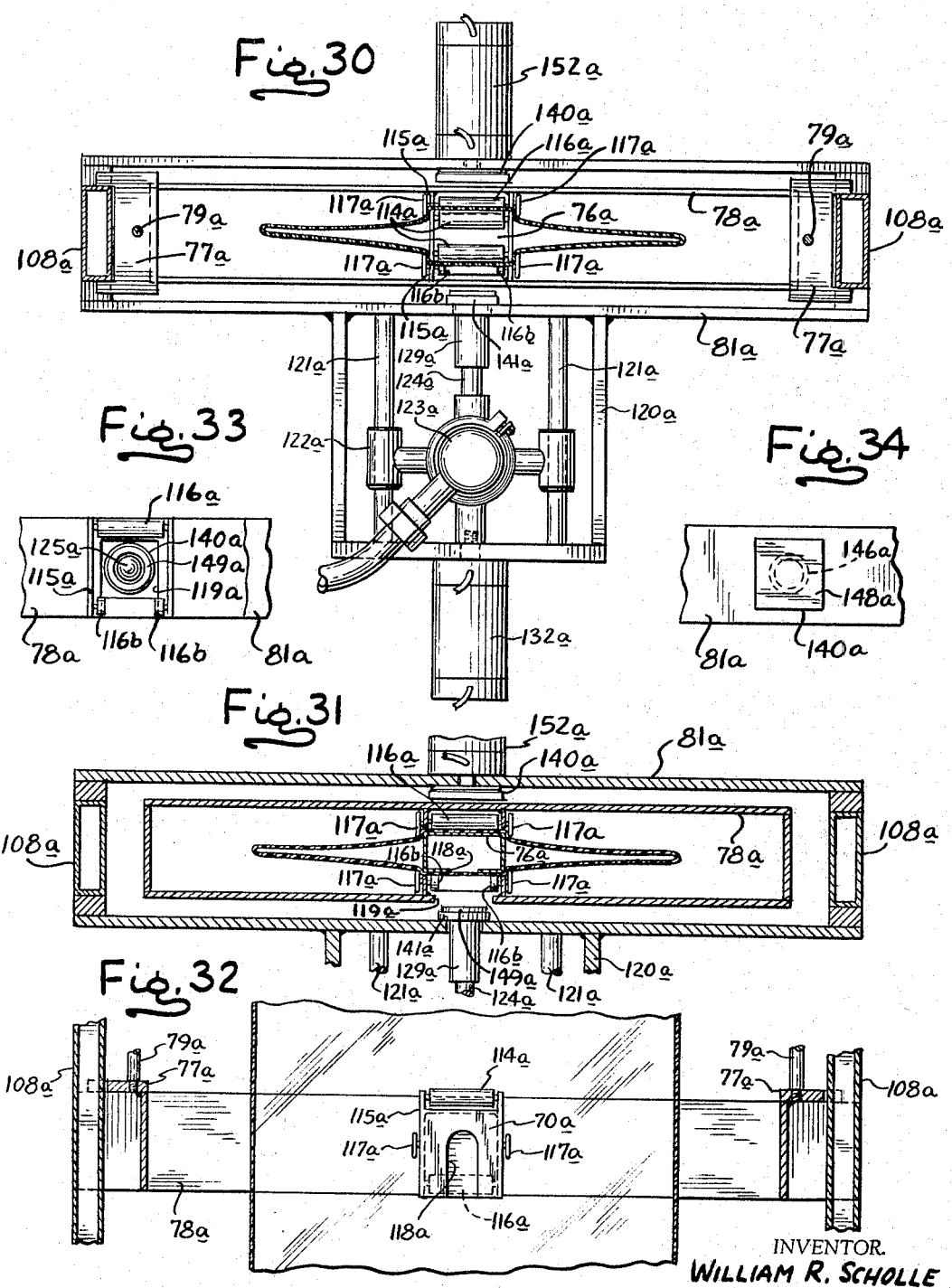

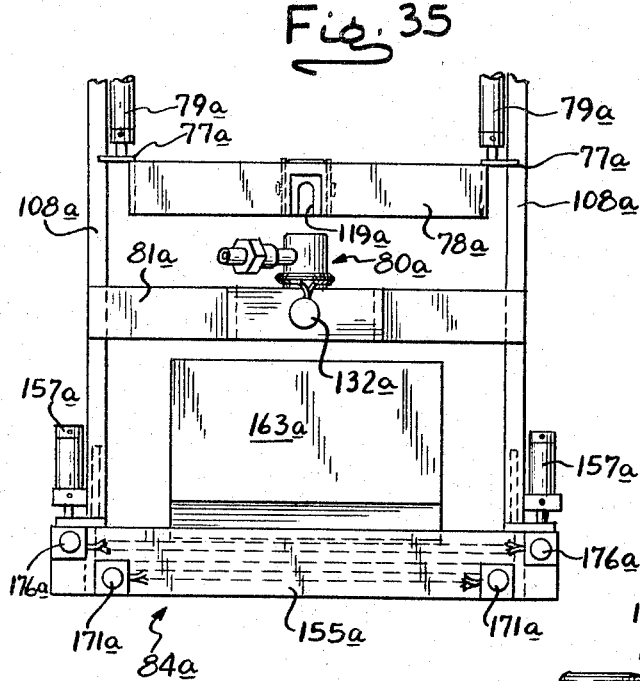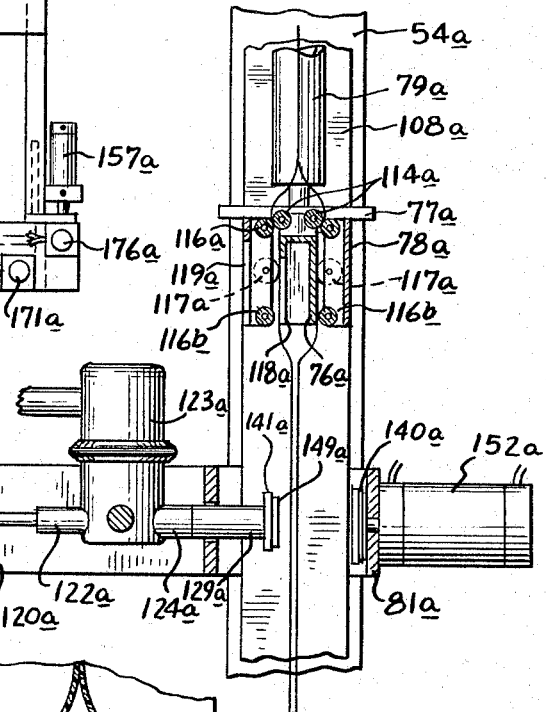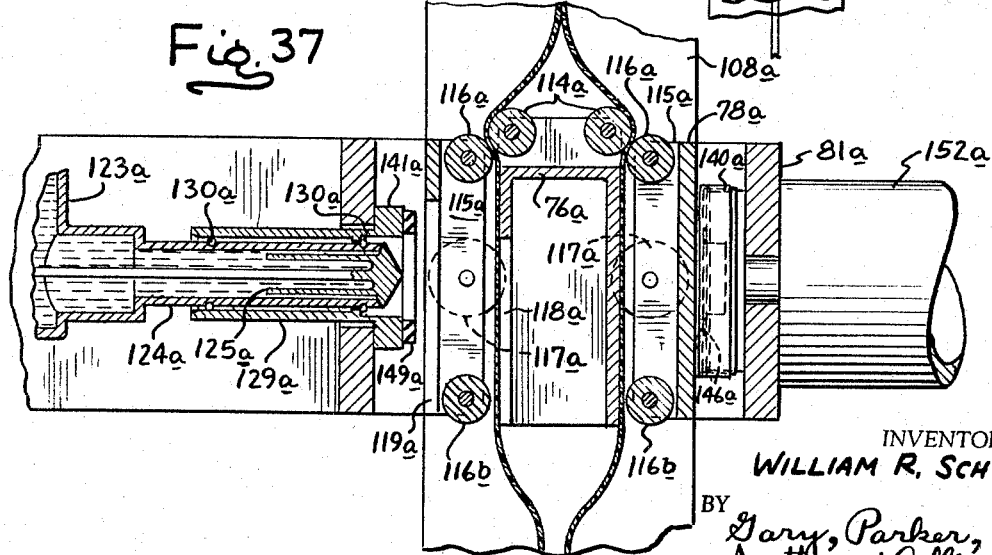

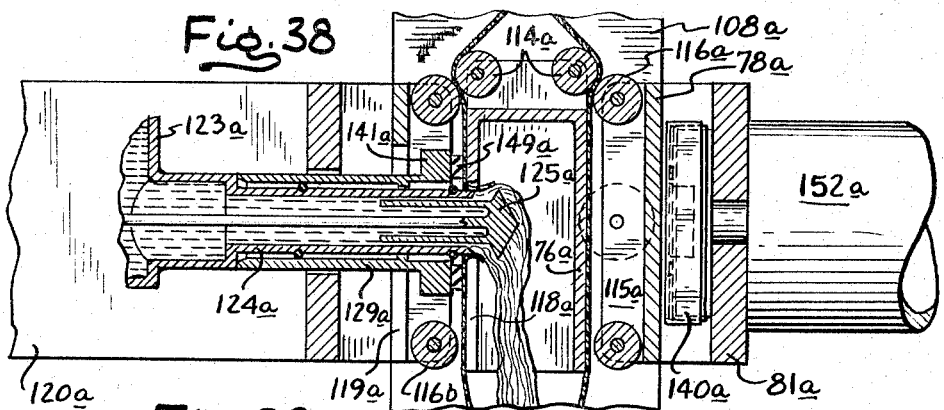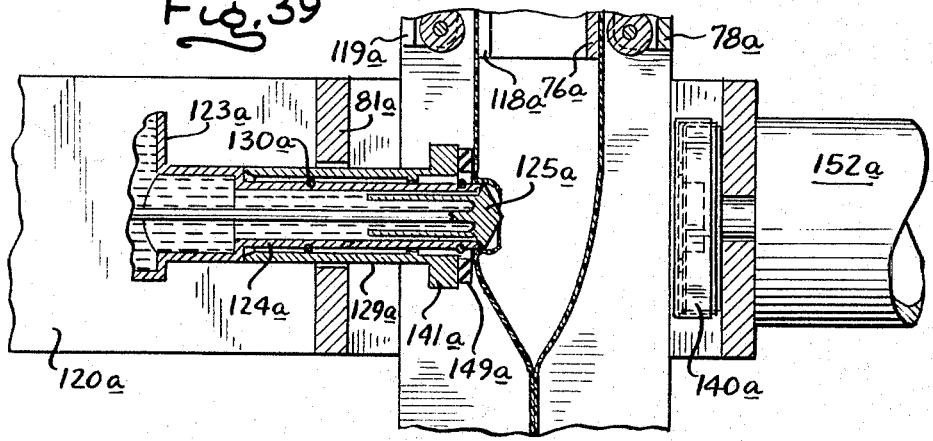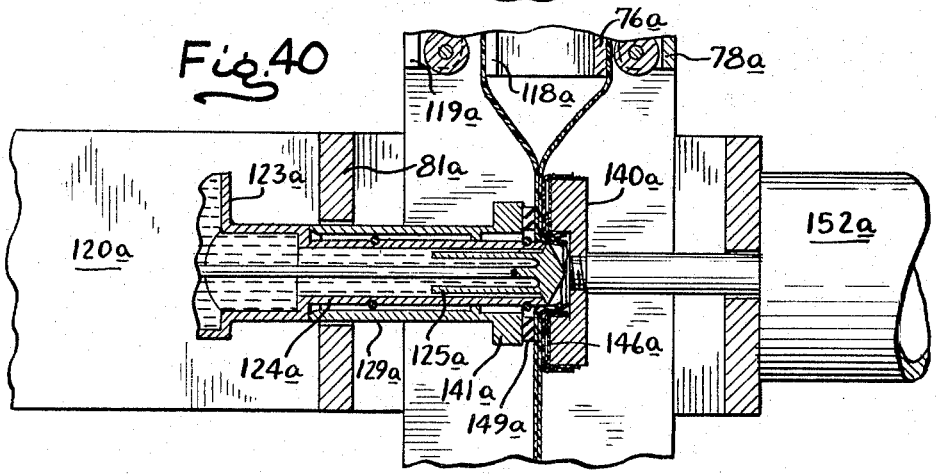

INVENTOR.
WILLIAM R. SCHOLLE
BY
Gary, Parker, Juettner & Cullinan
ATTYS.

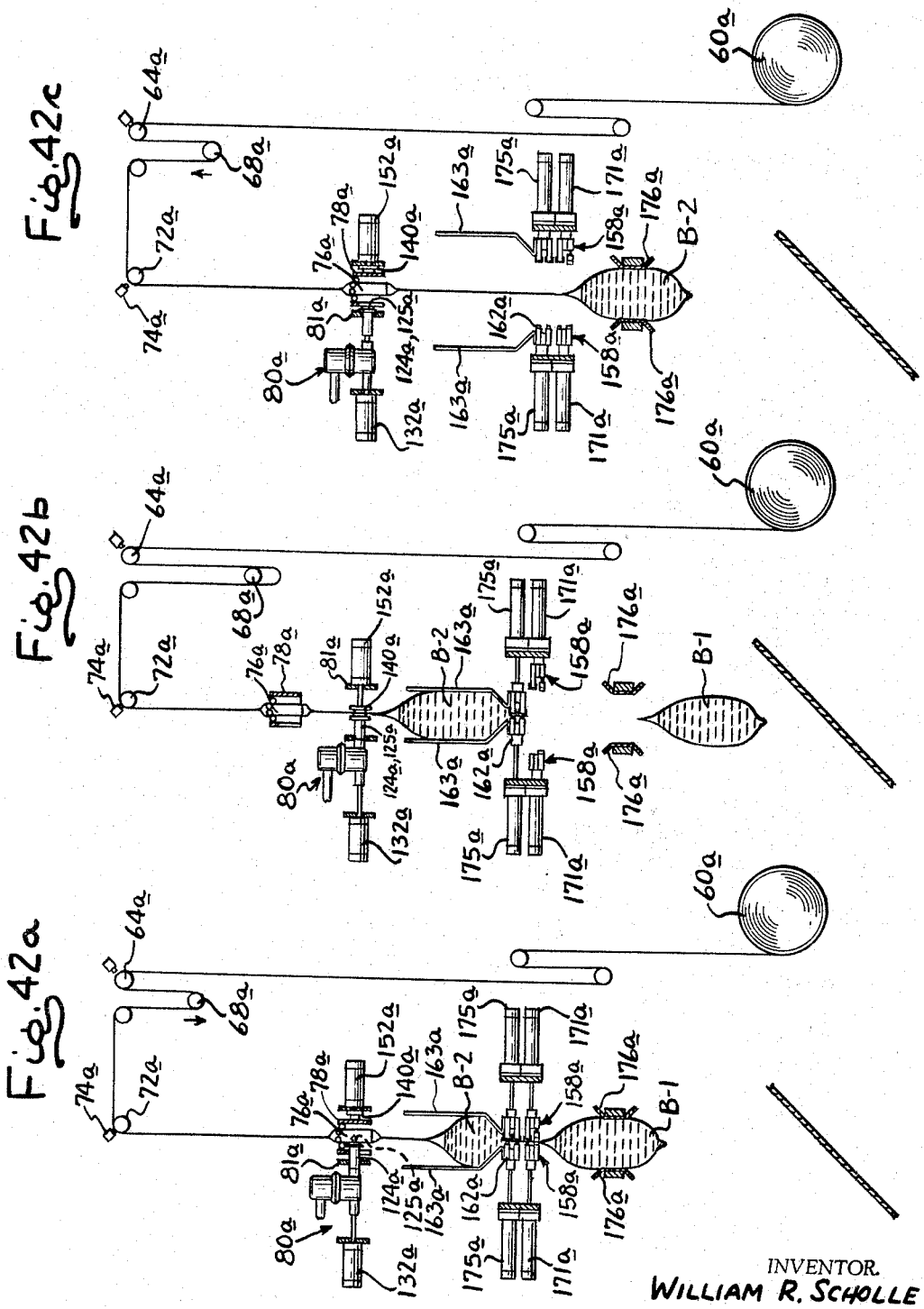

Aug. 8, 1967 W. R. SCHOLLE 3,334,466
PROCESS AND APPARATUS FOR CONTINUOUSLY FORMING
AND FILLING FLEXIBLE CONTAINERS
Filed Jan. 14, 1964 19 Sheets-Sheet 16
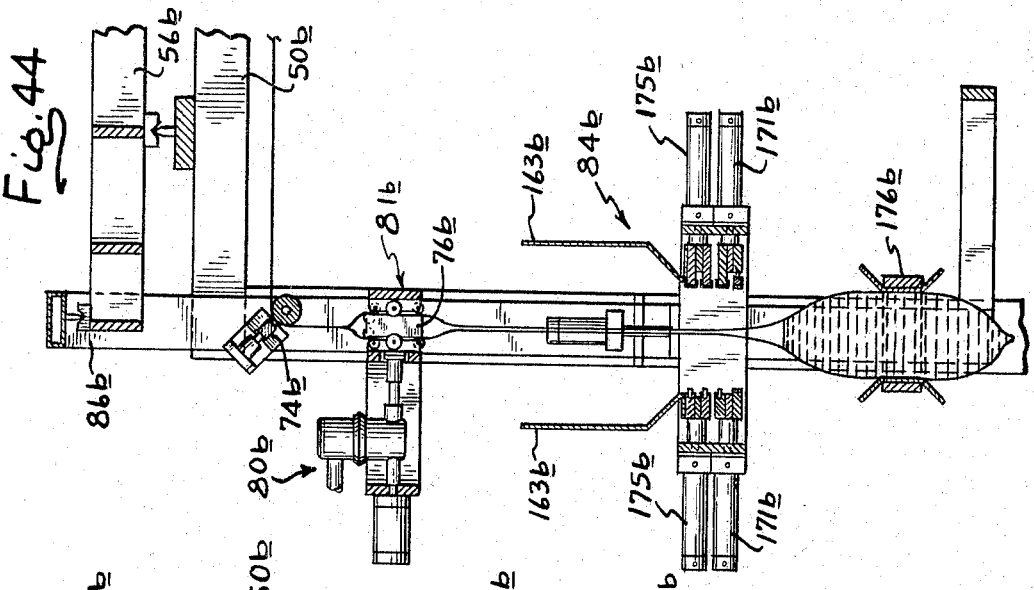
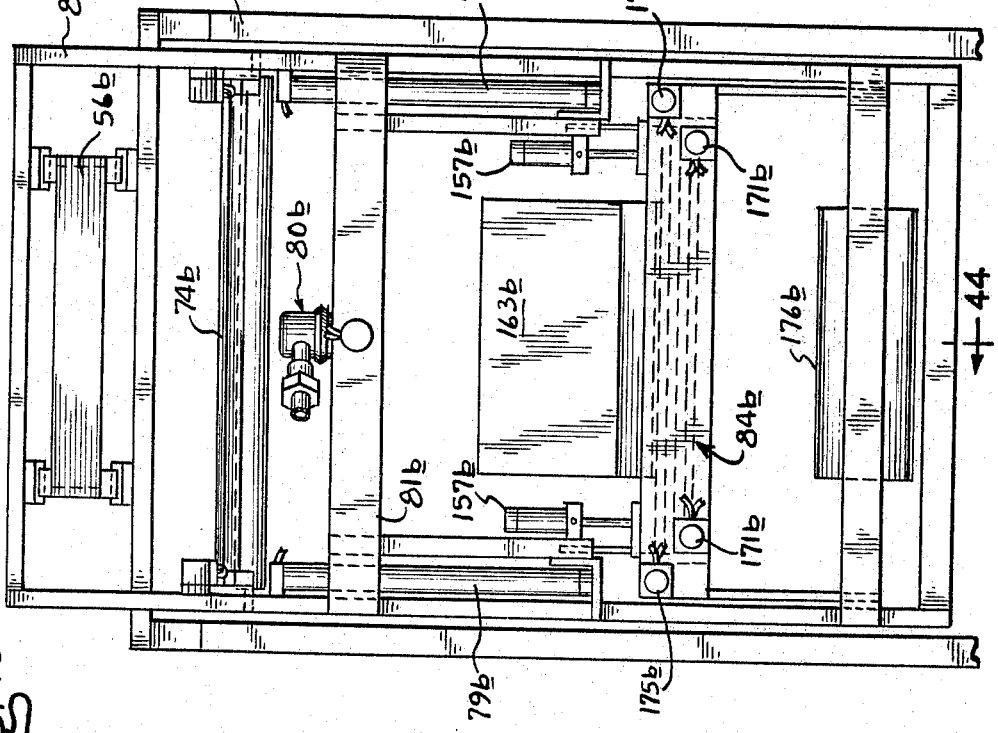
INVENTOR.
WILLIAM R. SCHOLLE
BY
Gary, Parker, Juettner & Cullinan
ATTYS.

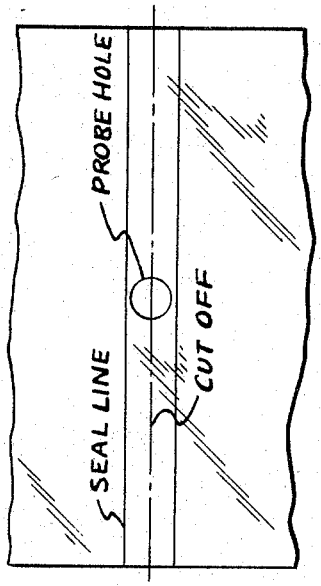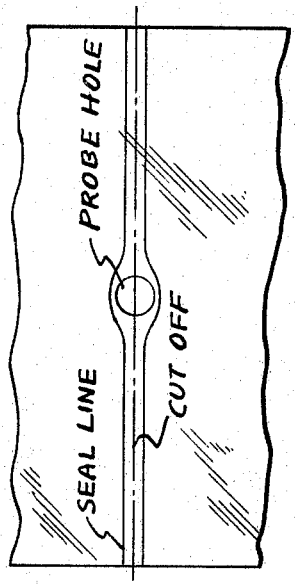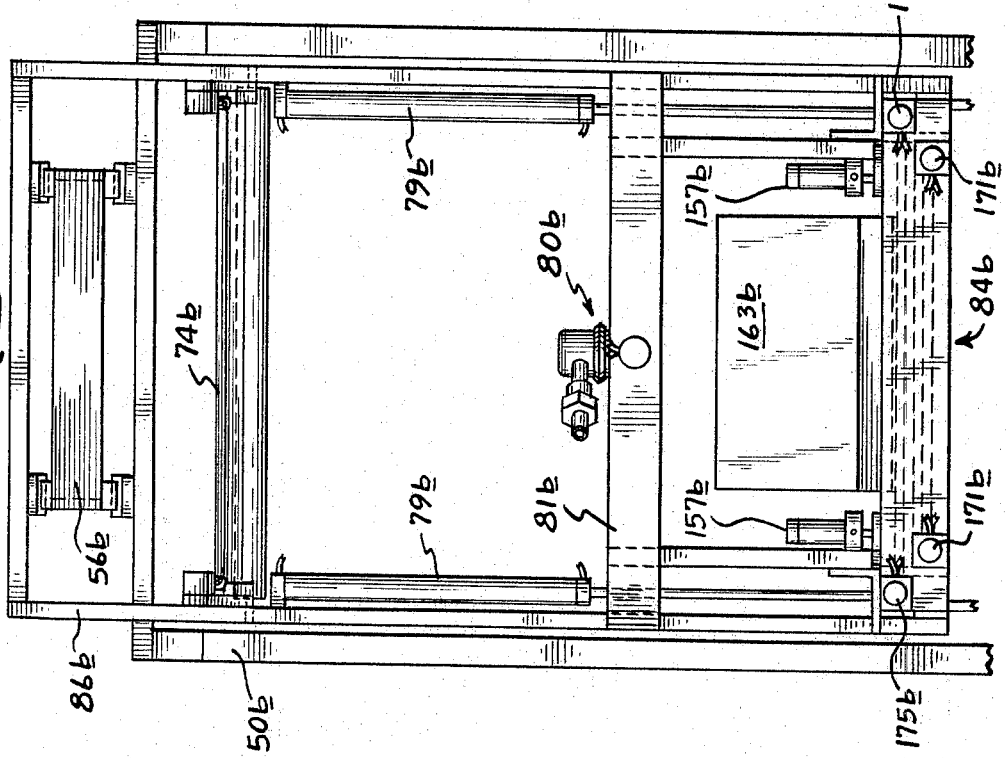

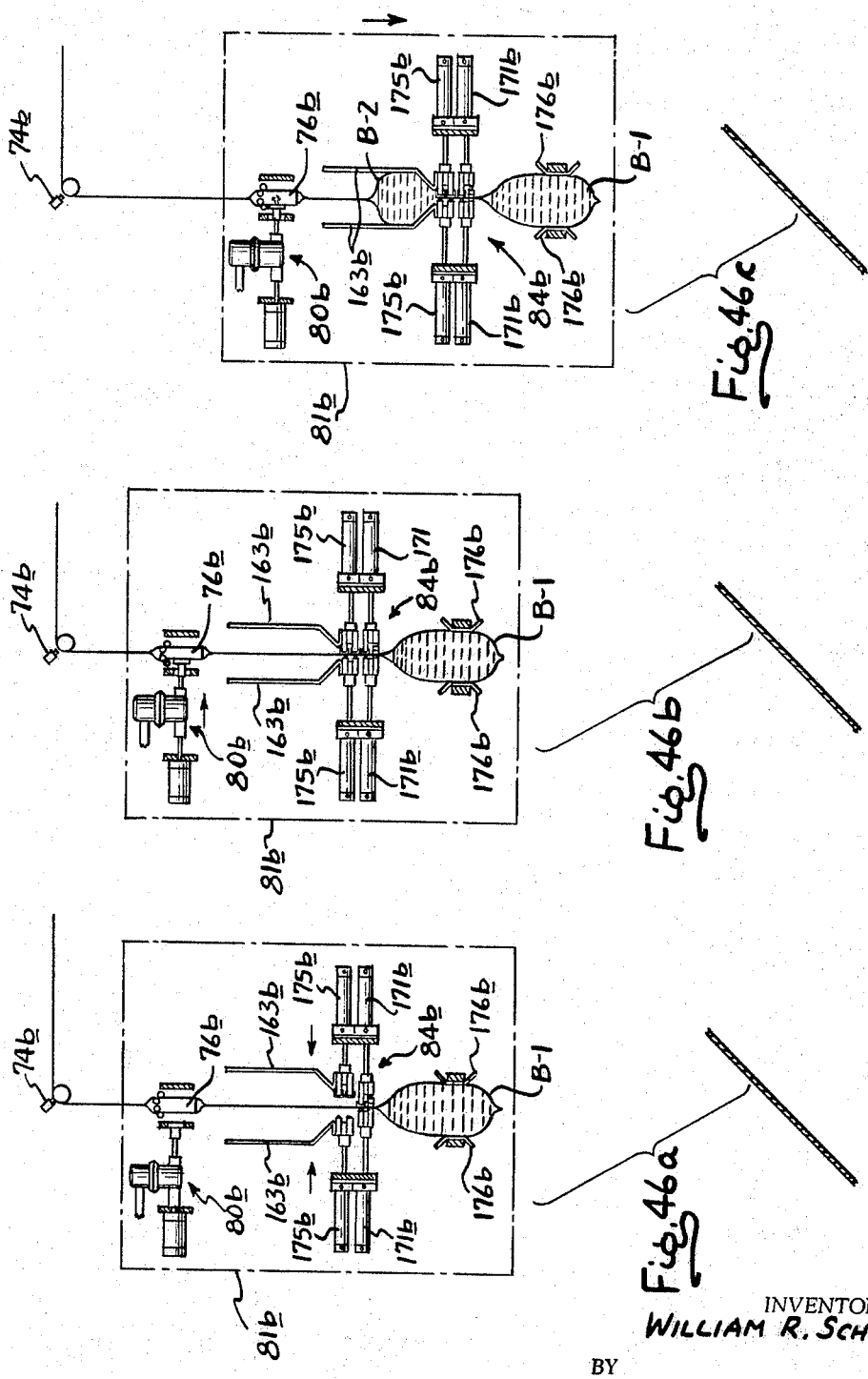

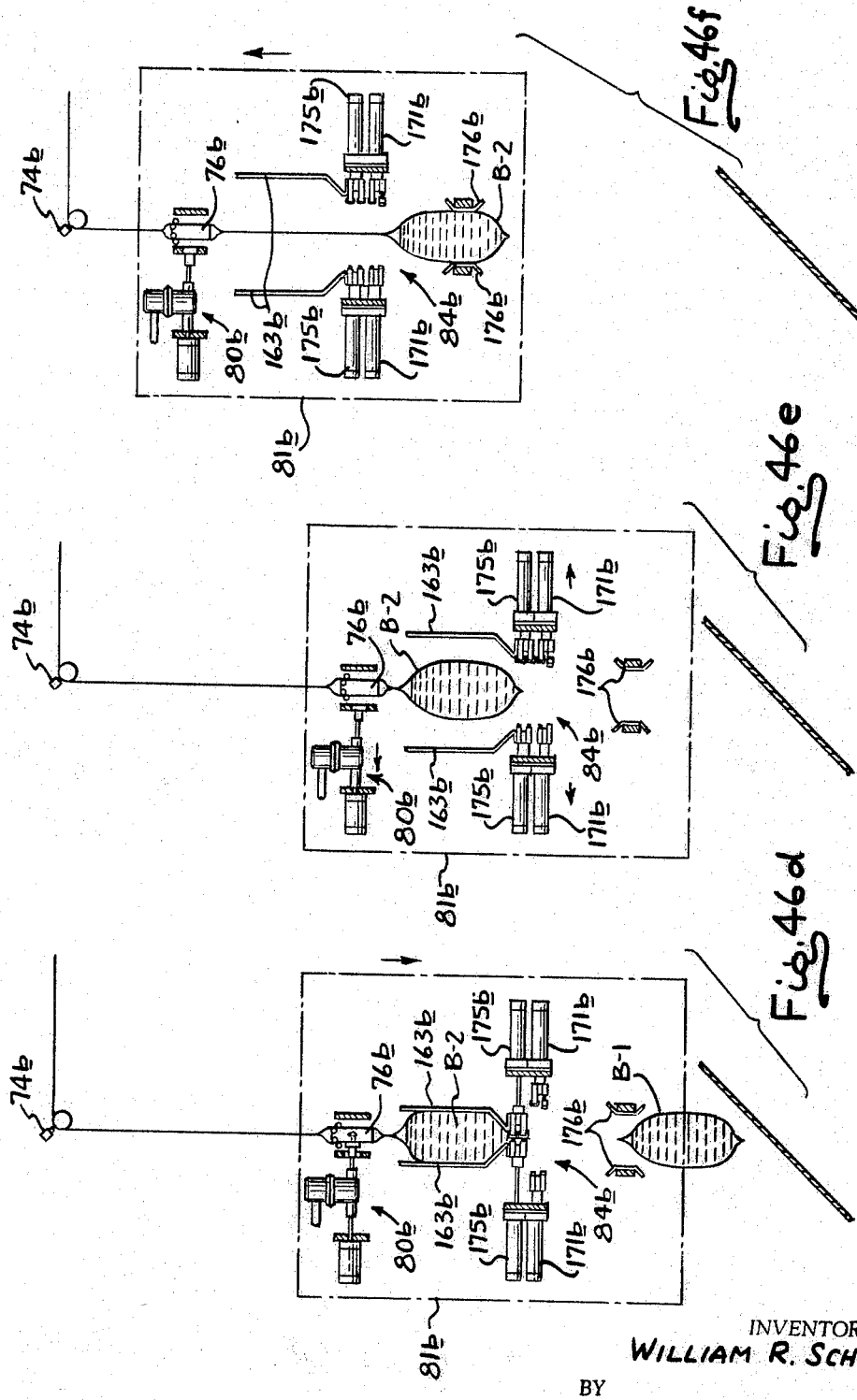

United States Patent Office 3,334,466
Patented Aug. 8, 1967

3,334,466
PROCESS AND APPARATUS FOR CONTINUOUSLY FORMING AND FILLING FLEXIBLE CONTAINERS
William R. Scholle, Long Beach, Calif., assignor to Scholle Container Corporation, Chicago, Ill., a corporation of Illinois
Filed Jan. 14, 1964, Ser. No. 337,598
49 Claims. (Cl. 53—28)

This invention relates to a novel process and apparatus for continuously forming and filling flexible containers with fluent material; for example, the sanitary packaging of materials such as chemicals, food products, pharmaceuticals and the like.

More particularly, the invention pertains to a novel method and means for converting continuous lengths of flexible tubing, in a continuous and automatic manner, into a plurality of individual endwise closed containers filled with fluent material.

The material employed for the containers, in the examples given, is preferably conventional thermoplastic film, i.e. heat-sealable film material such as polyethylene, polypropylene, etc., formed into a tube. Such materials are generally advised for the packaging of commodities such as battery acid, milk, liquid and particulate drugs, etc. The tube may comprise a conventional directly extruded tubular film, two sheets of film sealed at their longitudinal edges in face-to-face relationship, or a single sheet of film formed into a tube and longitudinally sealed. The tubular material may be supplied substantially continuously from rolls or reels; it may be continuously fed directly from apparatus which forms the tubular material or which forms flat film into tubes; or the latter means may be embodied in the container forming and filling apparatus.

The object of the invention is to provide a novel process and apparatus for sealing the free end of the flexible tube, introducing fluent material into the free end portion of the tube through the wall thereof, sealing the tube above the fluent material to form a pillow-like package of fluent material, and severing the package from the continuous supply of tubular film, without wasting either fluent material or container material and yet providing an attractive package.

In carrying forward the process of continuously forming and filling flexible containers, especially tubular thermoplastic film, the problem is encountered of gaining access to the interior of the tube. As above noted, the process of the invention proposes to fill the tube through the wall thereof, which creates the specific problems of opening or spreading the tube and entering through the flexible yielding wall thereof.

It is an object of the invention to overcome the stated problems by passing the tubular film about a hollow mandrel thereby to open or spread the tube and to provide a rigid support for a section of the wall of the film, and by passing a tube filling probe through both the section of the film supported by the mandrel and the mandrel itself so that the probe may enter through a firmly supported and relatively immovable wall section of the tube into the interior of the spread portion thereof.

More particularly, it is an object of the invention to provide a novel process and apparatus for sustaining a wall section of the tube by means of a hollow mandrel having a hole in one wall thereof, fixedly retaining the section of film on the mandrel wall by engaging a tubular retainer against the wall about the hole, and then piercing or entering through the film by pushing a filling probe through the interior of the tubular retainer and through the hole in the mandrel in the interior of the mandrel and thus the interior of the tube.

While not essential in all embodiments, it is nevertheless another object of the invention to provide a novel process and apparatus as aforesaid wherein the pierced or probe-hole portion of the tube is sealed closed following predetermined filling of the free end portion of the tube. According to the invention, this may be accomplished by (a) relatively moving the mandrel, tube and probe to cause the pierced or probe-hole portion of the tube to be disposed clear of the mandrel, and then sealing opposite sides of the tube together in a circle about the hole or (b) applying a patch over the probe hole portion of the tube.

As either an alternative or an adjunct to the foregoing, the probe hole may be located in what will ultimately constitute the selvage between two packages and the tube sealed transversely both above and below the hole and it is an object of the invention to provide means facilitating this result.

A further object of the invention is the provision of a novel process and apparatus as aforesaid wherein the tubular container material is automatically advanced by virtue of the filling operation without need for film advancing means. Specifically, in a first embodiment, the tubular material is advanced intermittently to the mandrel and probe in uniform increments under the motivating force of gravitational influence on the filled end portion of the tube, and wherein incremental movement is governed by alternately braking the container material at two spaced locations and intermittently festooning a predetermined length of the material between said two locations. In a second embodiment, the tubular material may be advanced continuously, or substantially so, by causing the filling probe to move with and itself advance the tubular material.

In the latter respect, it is a particular object of the invention to provide for substantially continuous operation by causing the filling probe to move with the tubular material in the direction of its movement.

A still further object of the invention is the provision of a novel process and apparatus as above defined wherein the portion of the tube being filled is sustained by a scale and filling of the tube is governed by the weight of the fluent material to insure accurate apportioning of the fluent material. In lieu thereof, volumetric control means may be employed, such as one comprising a positive displacement piston. A further alternative comprises positive drive means or positive time cycling.

Specific objects in addition to those stated include the provision of improved means for controlling the condition of the container material during passage through the filling apparatus, for mitigating foaming of liquids during filling, for properly supporting the portion of the container material being filled, and for individually sealing off each package as filling is completed and severing the package from the remainder of the material.

In the latter respect, it is a particular object of the invention to provide compact means for sealing off the upper end of one package and the lower end of the next succeeding package in closely adjacent relation and substantially conjointly severing the lower package from the upper package.

Other objects and advantages of the invention will become apparent from the following detailed description of the preferred embodiments of the apparatus of the invention.

Now, in order to acquaint those skilled in the art with the manner of practicing my novel process, and of making and using my novel apparatus, I shall describe, in connection with the accompanying drawings, preferred embodiments of the apparatus of my invention and the preferred manners of making and using the same, from which the process of this invention will become apparent to those skilled in the art.

In the drawings, wherein like reference numerals indicate like parts:

FIGURE 2 is a vertical section taken substantially on line 2—2 of FIGURE 1;

FIGURE 3 is a top plan view of the apparatus shown in FIGURES 1 and 2;

FIGURE 4 is a rear elevation of the upper portions of said apparatus;

FIGURE 5 is a cross-sectional detail taken substantially on line 5—5 of FIGURE 4;

FIGURE 6 is a transverse section of tube holding or nip roll means, the view being taken substantially on line 6—6 of FIGURE 2;

FIGURE 7 is a sectional detail taken substantially on line 7—7 of FIGURE 6;

FIGURE 8 is a vertical cross-section of the nip roll taken substantially on line 8—8 of FIGURE 6;

FIGURE 9 is a horizontal cross-section taken immediately above the tube filling portion of the apparatus of the invention, specifically on line 9—9 of FIGURE 1;

FIGURE 10 is a perspective view of the tube filling probe and the apparatus associated therewith;

FIGURE 15 is, in effect, a front elevation of the tube mandrel, the view being taken substantially on line 15—15 of FIGURE 11;

FIGURE 16 is a horizontal cross-section of the mandrel and its supporting apparatus, the view being taken substantially on line 16—16 of FIGURE 15;

FIGURE 17 is a horizontal section through the apparatus immediately above the means provided in the embodiment of FIGURE 1 for sealing the tube about the probe hole, the view being taken substantially on line 17—17 of FIGURE 1;

FIGURE 18 is a front view of the energized sealing element of the sealing means shown in FIGURE 17, the view being taken substantially on line 18—18 of FIGURE 17;

FIGURE 19 is a horizontal section of the sealing elements, the view being taken substantially on the line 19—19 of FIGURE 18;

FIGURE 20 is a perspective view of the means for sealing the tube across its width after filling of a portion of the tube, and for severing the filled portion of the tube to form an individual fluent material filled package;

FIGURE 21 is a fragmentary perspective view of portions of the apparatus shown in FIGURE 20, parts of the apparatus being broken-away to show the spreader bar and cams;

FIGURE 22 is a fragmentary exploded perspective view of one of the spreading bars and its support;

FIGURE 23 is a fragmentary cross-sectional view of the sealing means, the view being taken substantially on line 23—23 of FIGURE 1 and showing the sealing means in open position;

FIGURE 24 is a view similar to FIGURE 23 showing the sealing means in closed position;

FIGURES 25a, 25b and 25c are schematic diagrams illustrating the sequence of forming and filling flexible containers performed by the apparatus of FIGURES 1 through 24;

FIGURES 26a, 26b, 26c and 26d are schematic diagrams illustrating the sequence of forming and filling flexible containers wherein the probe hole in the tubular material is closed by applying a patch thereto;

FIGURE 27 is a partial front elevation, similar to FIGURE 1, of a second embodiment of the embodiment of the apparatus of this invention;

FIGURE 28 is a fragmentary vertical section of said second embodiment, the view being taken substantially on line 28—28 of FIGURE 27;

FIGURE 29 is an enlarged vertical section of the tube filling mechanism and the mandrel, the view being taken substantially on line 29—29 of FIGURE 27;

FIGURE 30 is a horizontal section through the apparatus immediately above the tube filling mechanism and mandrel, the view being taken substantially on line 30—30 of FIGURE 27;

FIGURE 31 is a horizontal section through the tube filling apparatus and mandrel, the view being taken substantially on line 31—31 of FIGURE 27;

FIGURE 32 is a vertical transverse section of the apparatus taken substantially on line 32—32 of FIGURE 29, the view showing one face of the mandrel in elevation;

FIGURE 33 is an elevational view of the tube filling probe and a sealing element associated therewith, the view being taken substantially on line 33—33 of FIGURE 29;

FIGURE 34 is an elevation of the face of a second sealing element which is opposed to the probe the view being taken substantially on line 34—34 of FIGURE 29;

FIGURE 35 is a fragmentary front elevation of the apparatus showing the mandrel raised above the tube filling apparatus;

FIGURE 36 is a vertical section of the apparatus with the mandrel raised;

Figure 1:
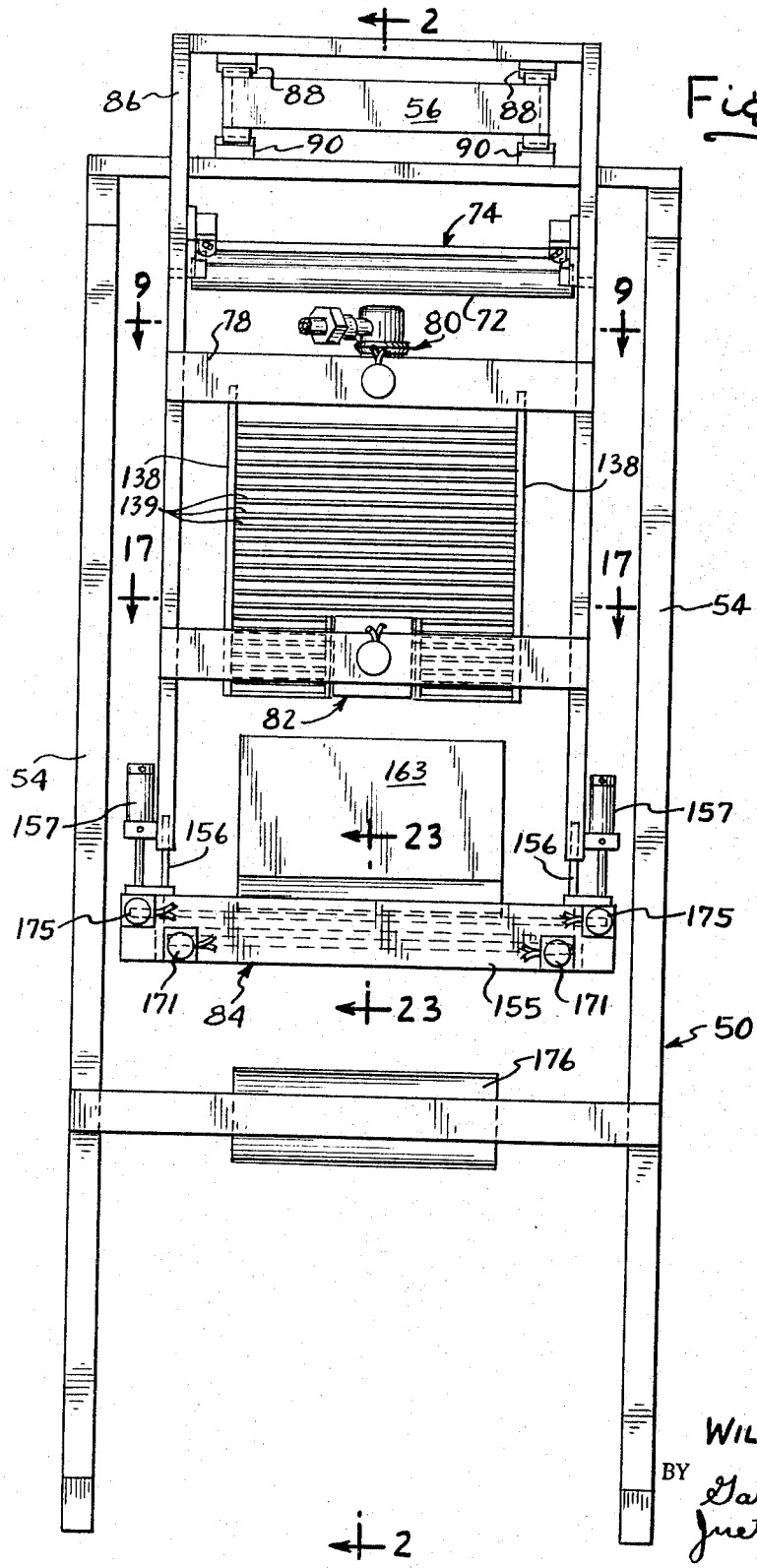
FIGURE 1 is a front elevation of a first embodiment of the apparatus of the invention.
Figure 49:
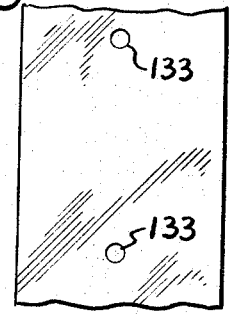
Figure 50:
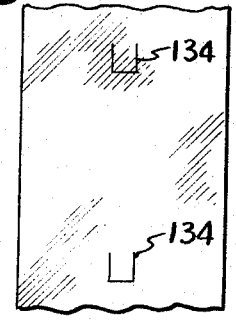
Figure 51:
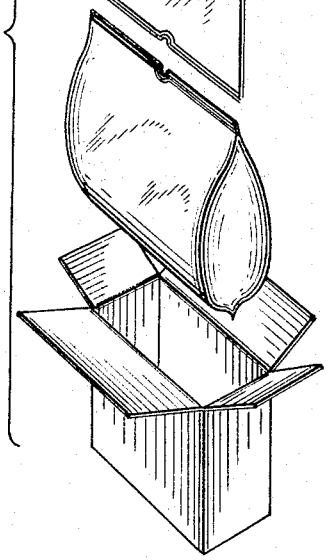

FIGURES 37 through 41 are enlarged vertical sectional views of the tube filling mechanism, the mandrel and the probe hole sealing means showing, in sequence, the probe immediately prior to entry into the tube, the probe entered into the tube and filling the same, the mandrel raised above the probe, the sealing elements engaged with the tube to seal the same about the probe hole, and the filling and sealing elements retracted from the tube;

FIGURES 42a, 42b and 42c are schematic diagrams illustrating the sequence of forming and filling containers performed by the apparatus illustrated in FIGURES 27 through 41;

FIGURE 43 is a fragmentary front elevation, similar to FIGURES 1 and 27, of a third embodiment of the apparatus of this invention;

FIGURE 44 is a fragmentary vertical section of said third embodiment, the view being taken substantially on line 44—44 of FIGURE 43;

FIGURE 45 is a front elevation similar to FIGURE 43 but showing the filling mechanism in relatively lowered position;

FIGURES 46a, 46b, 46c, 46d, 46e and 46f are schematic diagrams illustrating the sequence of forming and filling containers performed by the apparatus illustrated in FIGURES 43 through 45;

FIGURES 47 and 48 are fragmentary elevations of tubular container material illustrating different manners of sealing the material above and below the probe hole portion of the material;

FIGURES 49 and 50 are fragmentary elevations of tubular container material pre-perforated to facilitate entry of the filling probe; and FIGURE 51 is a schematic representation of the movement of the film and the final discharge of an individual, fluent-filled, pillow-like package into a protective box or carton therefor.

Referring now to the drawings, and particularly to FIGURES 1 through 4, I have shown a first embodiment of the invention as comprising a skeletal rectangular frame 50 adapted to be set on the floor at any convenient location. One side of this frame, as defined by the vertical legs 52, comprises mounting means for film feeding means to be described in detail hereinafter. The opposite side of the frame, as defined by vertical legs 54, comprises mounting means for the container filling and forming apparatus, also to be described in detail hereinafter, and the upper end of the frame comprises a support for a scale mechanism or balance beam 56.

The legs 52 of the frame define thereon bearing means for rotatably supporting a shaft or axle 58 on which a roll or reel 60 of container forming material is adapted to be mounted. The container forming material is preferably thermoplastic tubing, formed in any of the manners previously described, folded flat and wound on the reel. From the roll or reel 60 the container material is run upwardly around a pair of guide rollers 62 supported by the legs 52, and thence upwardly over the top of a first nip or brake roll 64. Associated with this roll is a braking mechanism 66 to be described in detail hereinafter. In general, the brake is adapted to be forced against the surface of the nip roll 64 to confine the container material between the roll and brake and prevent movement of the film at this location.

From the brake roll 64, the container material is reaved downwardly under a dancer roll 68 which is movably supported between the legs 52 for vertical reciprocatory movement by means of a pair of fluid pressure operated motors 70, the cylinders of which are fixedly secured to the stationary framework and the pistons of which are connected to the dancer roll. The container material is then run upwardly over a guide roll 71 adjacent the brake roll 64 and then horizontally across the frame under the balance beam 56. At the front side of the machine, as defined by the legs 54, the container material is reaved downwardly around a second nip or brake roll 72, which has associated with it a brake 74 substantially identical to the brake 66.

The film is then extended downwardly over a mandrel 76 which is inserted within the tubular container material when the leading edge of this material is first reaved through the machine. The mandrel 76 is provided with a support 78 exteriorly of the tube, and a tube piercing probe and filling mechanism, indicated generally at 80, is associated with the support 78. From the mandrel, the tube extends downwardly between opposed elements of a probe hole sealing mechanism, indicated generally at 82, and thence downwardly to a sealing and cutting assembly, indicated generally at 84.

In the embodiment of the invention illustrated in FIGURES 1 through 25, the sealing and cutting assembly 84 is disposed below the mandrel by a distance equal substantially to twice the length of tubular film or container material allocated for each package, and the probe hole sealing mechanism 82 is located centrally between the mandrel 76 and the sealing and cutting assembly 84.

The entire vertical assembly of the nip roll 72, the mandrel 76, the mandrel support 78, the tube piercing probe and filling mechanism 80, the probe hole sealing mechanism 82 and the sealing and cutting assembly 84 is mounted on a sub-frame 86 which is slidably guided between the front legs 54 of the frame 50 and which is supported at its upper end by knife edges 88 on the outer end of the scale or balance beam 56. The balance beam 56, in turn, is supported intermediate its ends by knife edges 90 on a cross-brace of the frame 50, and the entire mass of the sub-frame 86 and the components mounted thereon is counterbalanced by a weight 92 secured to the opposite or inner end of the beam. In addition, the inner end of the beam is adapted for reception of removable or variable weight means 94 facilitating weighing out of predetermined quantities of fluent material into the packages formed by the apparatus of this invention.

In use of the apparatus, the selected thermoplastic tubing is reeved through the machine components in the manner above described, and the necessary number of weights 94 are associated with the balance beam 56 to accommodate weighing out of the desired amount of fluent material into individual packages. The fluent material may be powdered, granular, particulate or liquid, and in some instances may even be gaseous. For purposes of the present disclosure, the material to be inserted into the individual packages will be described as liquid, such as milk or battery acid, but it is to be understood that references herein to liquid are deemed to be equally applicable to the other forms of material.

As a first stage in the operation, the brake 74 is applied so as to retain the web of tubing in fixed position at the front nip or brake roll 72. At the same time, or substantially so, the brake 66 is released from the nip or brake roll 64 to accommodate passage of the tubing over the roll. As will become apparent as the description proceeds, the tubing is fed intermittently in predetermined longitudinal increments by alternate application of the brakes 66 and 74, coupled with intermittent operation of the dance roll 68.

The dance roll 68 is operated by the two reciprocatory air or hydraulic motors 70 at a time when the front brake 74 is applied and the rear brake 66 is released. Initially, the motors 70 drive the dance roll downwardly, thereby drawing a length of tubing off of the reel 60 and festooning the same in a U-shaped loop between the rolls 64 and 71. Preferably, as shown in FIGURES 4 and 5, the dance roll 68 is rotatably mounted on a shaft 100 to which the piston rods of the motor 70 are connected. By providing a journal connection between the shaft and the piston rods, the shaft 100 may be utilized for control purposes by mounting a pinion 101 thereon for cooperation with a rack 102, the rack suitably being secured to a guiding sub-frame 103 for the dance roll 68. Preferably, the dance roll is guided for vertical reciprocation by means of guide blocks 104 slidably mounted in vertical slots in the side members of the sub-frame 103, whereby the dance roll is restricted to reciprocation in a single vertical plane.

The reciprocatory stroke of the motor 70 is such as to festoon a predetermined length of tubing into the area between the rolls 64 and 71, and adjusting nuts 105 are mounted on the piston rods of the motors to control their return stroke, and thus control the amount of tubing that will be payed out on each cycle of operation, as will presently appear. In use, air under pressure or hydraulic fluid is supplied to the upper ends of the cylinders of the two motors to drive the dance roll 68 downward to the extent of movement accommodated by the motors 70. As the piston rods approach their lower limit of movement, the guide blocks 104 are brought into engagement with compression springs 106 disposed in the lower ends of the guide slots in the sub-frame 103. Subsequently, when pressure on the pistons of the motors 70 is relieved, the springs 106 will move the dance roll upward to a slight extent to release the tension on the tubing. At the same time, the motors are relieved of pressure so that the piston rods may be moved upwardly by the film in a manner to be described.

When a predetermined longitudinal increment of the tubing has thus been festooned adjacent the rear legs 52 of the frame 50, the brake 66 is applied to the nip or brake roll 64, and the brake 74 is released from the front brake roll 72. To facilitate these operations, each of the rolls 64 and 72 and the brakes 66 and 74 are constructed as shown in FIGURES 6 to 8 for the front brake assembly 72–74.

As shown, the brake roll 72 is journalled on a shaft 107 so that the roll may rotate freely and facilitate passage therearound of the flexible tubing, the shaft 107 in turn being firmly supported in the side members 108 of the sub-frame 86. The brake 74 comprises a rigid bar 109 which is slidably guided at its ends in slotted guideways 110 provided on each of the side members 108, the guideways mounting the bar for reciprocation radially of the roll 72. To facilitate the braking action without damage to the film, the brake bar is provided at its edge with a resilient bumper 111 for engagement with the film. Normally, the bumper 111 and bar 109 are retracted from the film by means of a pair of springs 112 disposed between the brake bar and each of the side members 108. To apply the brake forcibly to the film and the brake roll, a pair of solenoids 113 are mounted respectively on the side members 108 and connected to the brake bar 109. As will be obvious to those skilled in the art, energization of the solenoids 113 will result in application of the brake to the film, and de-energization of the solenoids will result in the springs 112 shifting the brake laterally away from the film to accommodate its passage around the roll.

In the sequence of operation of the machine, a portion of the tubing, i.e., the lower end portion thereof extending along the front legs 54 of the frame 50, will be filled with fluent material during the time that the dance roll 68 is festooning a predetermined length of the tubing between the brake roll 66 and the guide roll 71. Then, when the brake 66 is applied and the brake 74 is released, the weight of the fluent material in said lower end portion of the tubing will cause said lower end portion of the tubing to gravitate downwardly, thereby pulling forwardly and downwardly the increment of film festooned by the dance roll. As the film is thus pulled, it will again engage the dance roll and move the same upwardly with it as it is pulled toward the front of the machine. During this movement, residual hydraulic fluid or air within the cylinders of the motors 70 will cause the motors to act as dashpots affording a controlled movement of the film and preventing abrupt inpacts or stresses on the film. The festooned length of film will thus pay out until the pistons of the motors have been moved upwardly to such extent as determined by the position of the adjusting nuts 105, whereupon movement of the film will stop. Consequently, by appropriate adjustment of the nuts 105 on the piston rods of the motors 70, any increment of tubing may be advanced to the filling and sealing portions of the machine as may be desired or required for any particular packaging operation.

As the container tubing is pulled forwardly, it is guided downwardly around the brake roll 72 and then about the mandrel 76. As shown particularly in FIGURES 9 and 11 through 16, the mandrel 76 is comprised essentially of a box having a hollow interior and open at its bottom. The box may be of any desired height depending upon circumstances, and is preferably of a width substantially less than the width of the folded or flat tubing, as is apparent particularly from FIGURE 9. The side walls of the mandrel forming box extend upwardly above the top wall of the box and mount therebetween a pair of guiding and supporting rollers 114. As the tubing is initially reaved through the apparatus of this invention, the mandrel is inserted within the interior of the tubing with the rollers 114 uppermost, and the mandrel is then supported from the exterior of the tubing by means of the supporting structure 78.

The supporting structure 78 is comprised in essence of a pair of horizontal plates which extend transversely between the side members 108 of the sub-frame 86 and which, adjacent the center of the sub-frame, are provided with inwardly extending U- or channel-shaped members 115 within which are mounted guiding and supporting rollers 116. Preferably, there are two pairs of the rollers 116, a first pair adjacent the upper end of the mandrel upon which the mandrel rollers 114 are rotatably supported and a lower pair of guide rollers 116 which are engaged by the lower extremities of the mandrel and serve to retain the mandrel in a vertical position. Also, the channels 115 on their exterior surfaces support four wheels 117 which extend to opposite sides of the mandrel 114 to retain the same against lateral shifting.

In its passage through the supporting structure 78 about the mandrel 76, the tubing is thus movably guided by the rollers 114 and 116 and the wheels 117 so that the tubing may move freely over the mandrel without any damage to the tubing.

Figure 11:
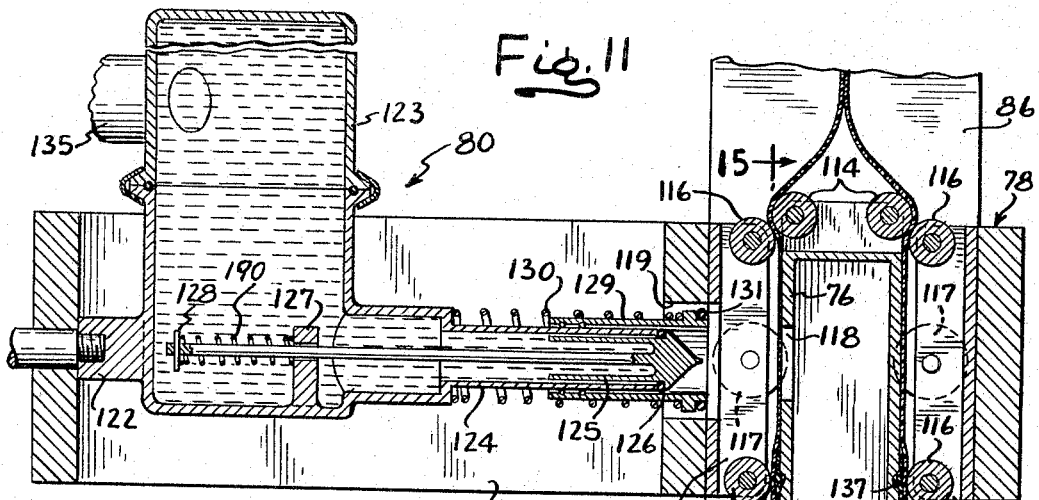
FIGURE 11 is an enlarged vertical section of the mandrel and filling apparatus of the invention, the view being taken substantially on line 11—11 of FIGURE 9.
Figure 12:
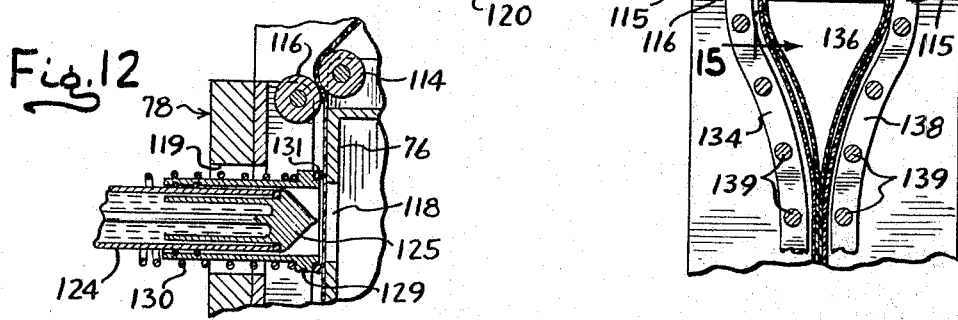
FIGURES 12, 13 and 14 are fragmentary sectional views showing progressive movement of the probe toward and into the tube supported by the mandrel.
Figure 13:
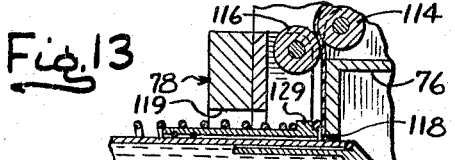

The hollow mandrel 76 is provided in one wall thereof, preferably the front wall thereof, with an aperture 118, which in this embodiment of the invention may suitably comprise a circular hole. In the normal position of the mandrel, as illustrated in FIGURE 11 for example, the hole 118 is aligned horizontally with a concentric but slightly larger hole 119 in the supporting framework 78. Mounted on the support 78 in centered relation to the hole 119, and projecting to the front side of the machine therefrom, is a rectangular framework 120 which serves as a support for the tube piercing probe and filling mechanism 80.

As shown particularly in FIGURES 9 through 11, the mechanism 80 includes a pair of guide rods 121 projecting forwardly from the support 78 and rigidly secured at their outer ends to the framework 120. Slidably mounted on the two rods 121 is a carriage 122 which supports thereon a fill chamber 123 for fluent material and a fill tube 124 extending toward the mandrel 76 from adjacent the lower end of the chamber 123. Mounted within the fill tube 124 is a combined probe and valve member 125, the end of which adjacent the mandrel is pointed to facilitate piercing or entry thereof through the wall of the portion of the tubing disposed about the mandrel. The fill tube 124 and the member 125 are disposed concentrically of one another and the hole 119 in the support 78 and are aligned axially with and of a diameter slightly smaller than the hole 118 in the hollow mandrel. The member 125 is essentially cylindrical and is slidably mounted within the interior of the fill tube 124, the member being provided with a head somewhat larger than the inner diameter of the tube and carrying a seal 126 for engagement with the end of the tube for normally sealing the tube closed. To insure this action, the member 125 includes a stem extending into the interior of the fill chamber 123 through a supporting and guiding block 127, and normally urged to closed position by a compression spring 190 confined between the block 127 and a washer 128 secured adjacent the free end of the stem.

Slidably mounted on the exterior of the fill tube 124 is a combined tubing retaining and sealing member 129 in the form of a concentric tubular collar. The retaining collar is normally urged forwardly on the fill tube 124 by a compression spring 130 confined between a radial flange on the retainer and a portion of the fill chamber 123. Normally, the spring 130 causes the collar to be extended forwardly beyond the tip or pointed end of the probe 125 so that the probe and fill tube are normally protected from damage. At its outer end, the retaining collar 129 preferably carries a seal 131, such as an O-ring.

The carriage 122 thus mounts the assembly of the chamber 123, the tube 124, the member 125 and the collar 129 for reciprocatory movement transversely of the tubing material and the mandrel 76 along an axis aligned with the axis of the holes 118 and 119. To effect reciprocation of this assemblage of elements, a hydraulic or pneumatic reciprocatory motor 132 is provided, the cylinder of the motor being fixedly mounted on the framework 120, and the piston rod thereof being connected to the carriage for effecting reciprocation of the carriage. As will be observed from FIGURE 9, the motor 132 is preferably double-acting so as to move the filling and probe mechanism positively toward and away from the mandrel.

In operation of the apparatus, a fresh increment of tubing is brought into position relative to the mandrel in the manner previously described. During advancing movement of the tubing, the fill tube and probe mechanism is in a relatively retracted position, as shown in FIGURE 11. When the film has been brought to a stop, the motor 132 is energized to advance the carriage 122 toward the film. As advancing movement occurs, the retaining collar 129 is first engaged with the tubing material in the area thereof about the hole or aperture 118, whereby a seal is formed (by the sealing element 131) between the retaining collar, the tubing and the mandrel. At the same time, the collar serves to retain the tubing in a taut condition throughout the area thereof extending over the aperture or hole 118, and this retaining force is constantly maintained by virtue of the spring 130. After the tubing has thus been engaged and is retained in position by the collar 129, the probe 125 and fill tube 124 are moved through the collar to bring the point or tip of the probe into engagement with the tubing and to force the probe through the tubing and through the hole 118 in the mandrel to dispose the probe and the inner end of the fill tube within the interior of both the mandrel and the container material tubing.

Due to the fact that the tubing is supported by the mandrel, and is further maintained in a taut condition over the hole in the mandrel by the retaining collar 129, the probe 125 may readily pierce or enter through the plastic material of the tubing with little if any difficulty. Where lightweight films are being employed for the container tubing, the probe itself may directly pierce through the plastic material. On the other hand, if heavy gauge or extremely tough tubing is being used, the tubing itself may be pre-perforated to facilitate passage therethrough of the probe. For example, in FIGURES 49 and 50, two alternate methods of pre-perforation of the tubing are illustrated. In FIGURE 49, the perforations are in the form of small holes 133 pierced through one wall of the tubing at spacings equal to the incremental advance of the tubing afforded by the dance roll 68. In FIGURE 50, the pre-perforation takes the form of a U-shaped slit 134 in one wall of the tubing, which forms a flap that is readily pushed aside by the filling probe 124–125 as the probe enters into engagement with the tubing material.

The motor 132 advances the probe into the mandrel until the inner end portion of the fill tube 124 is disposed fully within the interior of the mandrel, and thus within the interior of the container tubing. At this time, as will be noted from FIGURE 14, the fill tube has essentially a sealed relationship with the mandrel and the tubing by virtue of the seal effected by the retaining collar 129.

When the fill tube has attained entry into the interior of the mandrel, as determined for example by operation of the motor 132 through a complete stroke, pump means (not shown) located either proximate to or remote from the apparatus is set into operation to supply fluent material via a supply pipe 135 to the upper end portion of the fill chamber 123 and thence through the fill tube 124. The pump supplies the fluent material under a pressure sufficient to overcome the biasing force of the spring associated with the combined probe and valve member 125, whereby the fluent material forces the probe open, i.e., further into the interior of the mandrel and away from the inner end of the fill tube 124, whereupon the fluent material flows through the fill tube into the interior of the mandrel and thence gravitates downwardly through the mandrel into the interior of the tubing.

The pump is maintained operative until a predetermined weight of fluent material has been delivered into the tubing, as determined by the balance beam assembly 56, whereupon the pump is de-energized, the pressure on the fluent material is relieved, and the combined probe and valve member 125 is returned to closed position and sealed to the inner end of the fill tube 124 by the spring 190. Thus, the fill tube is sealed shut against leakage, so that the same may safely be retracted from the tubing and the mandrel without spilling or wasting any of the fluent material. Any drips of material that tend to remain on the inner end of the fill tube are wiped therefrom, and drop into the interior of the mandrel, during retraction of the fill tube by virtue of the fact that a lip of the tubing engages the fill tube, as shown particularly in FIGURE 14.

After the filling operation has been completed, the pump has been deenergized and the combined probe and valve member 125 has moved to closed position, the motor 132 is again energized to retract the filling probe from the mandrel and the tubing. As retracting movement occurs, the fill tube 124 and probe 125 are first returned to their initial positions relative to the retaining collar 129, whereafter the retaining collar is also retracted from the tubing, thereby to release the tubing and accommodate a downward movement thereof, as has been described hereinbefore.

Thus, it is manifest that upon each operation thereof, the probe and filling mechanism 80 will positively enter into the interior of the mandrel and the tubing, discharge into the tubing a predetermined weight of fluent material, seal itself closed against leakage or wastage of material, and retract itself from the mandrel and the tubing to accommodate advancing movement of the tubing. Should the apparatus be employed for packaging liquids that have a tendency to foam, it is preferable to incorporate in the apparatus means for mitigating the foaming condition, thereby to facilitate packaging operations. To this end, the hollow mandrel 76 is provided at its lower end with a depending flexible tubular extension 136 which serves to carry the fluent material downwardly substantially to the point of discharge into the portion of the tubing being filled (actually to the upper limit of the probe hole sealer 82), thereby to minimize free vertical drop of the liquid and mitigate foaming.

Figure 14:
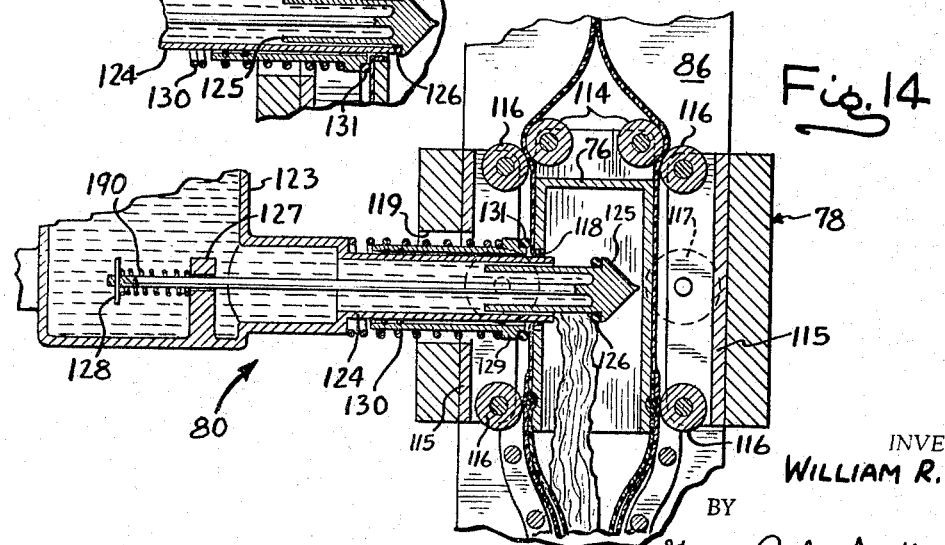

As shown in FIGURES 11 and 14, the anti-foaming tube 136 may suitably be associated with the mandrel by slipping the same over the lower end of the mandrel and retaining the same in place by means of a retaining band 137 which clips the tube 136 into a circumferential notch or recess formed in the walls of the mandrel. Also, mitigation of foaming may be assisted by a tubing flattening and supporting assembly comprised or vertical supports 138 extending downwardly from the support 78 and a plurality of vertically spaced rods 139 extending horizontally between the supports 138 to opposite sides of the tubing to flatten both the container tubing and the anti-foam tube 136 and thus form a limited or restricted path for vertical descent of the liquid material. In the embodiment of the invention illustrated in FIGURES 1 through 25, the anti-foaming fill tube 136 extends to a point just above the probe hole sealing mechanism 82, and the flattening rods 139 preferably extend somewhat below the latter mechanism.

In particular, it is a prime purpose of the vertical supports 138 and flattening rods 139 to flatten the tubing out to its full width and bring the two sides thereof into closely adjacent relation so as to facilitate the probe hole sealing operation. It is for this reason that the rods are extended to at least the lower edge of the sealing mechanism 82 (the rods being cut-way to accommodate passage therethrough of the sealing elements) so as to facilitate the probe hole sealing operation.

The sealing mechanism 82 is comprised of a sealing element 140 and a cooperable base plate 141 juxtaposed to one another on opposite sides of the tubing, as shown particularly in FIGURES 17 and 19. To support these two elements on the sub-frame 86, transverse plates 142 are extended between the side rails 108 of the sub-frame, each plate supporting one of the elements 140 and 141. The sealing element 140 is comprised of a mounting block 143 suitably secured in any conventional manner to the respective transverse plate 142. The block 143 has a hollow interior and a central bore therethrough. Slidably mounted within the central bore is a spring-pressed plunger 144 which serves as a release or "kick-off" button to break the film away from the element block in case sticking occurs.

Covering the forward face of the block 143 is a first sheet 145 of electrical insulating material, such as Fiberglas reinforced Teflon sheeting (or Teflon impregnated Fiberglas sheeting). Loosely disposed on the outer face of the first insulating sheet 145 is a ring 146 of an electrically conductive material having relatively high resistance so that the ring becomes heated as electric current is passed therethrough. Connected to the ring 146 and passing through the insulating sheet 145 are a pair of electrically conductive leads 147 which serve the dual function of connecting the ring 146 to a source of electrical energy and of loosely mounting the same on the outer face of the insulating sheet 145. As will be observed particularly from FIGURES 18 and 19, the leads 147 are connected to the ring and extend through the block 143 at points radially inwardly of the ring itself. Consequently, should these leads tend to become heated during use of the apparatus, the heat therefrom will have an effect only on the portion of the tubing disposed inwardly of the ring 146, which is the probe hole and thus the selvage portion of the tubing, whereby no damage to the material containing parts of the tubing will result from this extraneous heating.

Disposed in overlying relation to the sealing ring 146 and clamped to the block 143 is a second sheet 148 of electrical insulating material which serves to protect the tubing from direct contact with the heated sealing ring 146, and which also serves to confine the heat-sealing effect of the ring to a specific small area on the tubing. The second insulating sheet 148 is preferably Teflon sheeting, or Teflon impregnated sheeting, or similar sheeting having a low coefficient of friction and high resistance to heat to afford optimum mitigation against stricking of the tubing to the heat sealing elements.

The base plate 141 for the sealing element 140 comprises simply a solid block of metal bearing on the face thereof a sheet 149 of insulating material, preferably identical to the sheet 148. The base plate 141 is slidably guided on the respective transverse mounting plate 142 by means of a pair of studs 150 and 151 which extend through complemental apertures or holes in the plate 142. The stud 151 comprises the piston rod of a reciprocable pneumatic or hydraulic motor 152, the cylinder of which is secured to the respective transverse mounting plate 142 and the piston of which is connected to the base plate 141. As illustrated in FIGURE 19, the motor 152 is preferably double-acting for purposes of positively moving the base plate 141 toward the sealing element 140 and for positively retracting the base plate from the sealing element and the tubing.

As illustrated in the drawings, the probe hole sealing mechanism 82 is disposed below the filling probe 124–125 by a distance equal to the incremental advances of the tubing, whereby the hole in the tubing through which the probe hole passed during a first operation becomes disposed between the sealing element 140 and base plate 141 on the next succeeding incremental advance of the tubing. During the time that the probe (in a second operation) is again forced into the tubing, the base plate 141 is moved inwardly to confine the previous probe hole area of the tubing between the base plate and the sealing element, and the sealing ring 146 is then energized to heat and effect a thermal seal in an annular ring about the previously formed probe hole, whereby the probe hole is sealed closed.

During and after the sealing operation, fluent material being introduced into the tubing at the filling probe may flow relatively freely through the marginal portions of the flattened tubing about the base plate 141 and the sealing element 140, whereby occurrence of the sealing operation simultaneously with the filling operation does not in any way interfere with the latter operation. The sealing ring 146 is maintained energized for a predetermined time, generally less than the fill time, and a subsequent holding time may be provided if desired. The base plate 141 is then retracted from the tubing to facilitate another incremental descent of the tubing.

Located below the probe hole sealing mechanism 82 by a vertical distance equal to the incremental advances of the tubing material is the sealing and cutting assembly 84, which is illustrated in detail in FIGURES 20 through 24. According to the present invention, the mechanism 84 performs a number of functions of substantial importance in a commercially practical machine. First, the mechanism spreads the tube laterally outwardly so as to conform and flatten the same in the area immediately above the fluent filled portion of the tubing for the purposes of making a neat compact fluent filled package. Second, it positively flattens out the tubing in this same area to facilitate formation of a neat, attractive and leak-proof seal immediately above the fluent material. Third, the mechanism automatically forms a fluid-tight seal immediately above the first-named seal so as to define the bottom of a succeeding individual package. In other words, the mechanism automatically effects two seals transversely across the tubing material in closely spaced relation to one another, the lower one of which constitutes the seal at the upper end of a first container and the upper one of which comprises a bottom seal for a second container. Fourth, the mechanism severs the tubing between the two seals, thereby to sever the first or lower container from the remainder of the tubing material whereby an individual fluent filled pillow-like package is formed. Fifth, the mechanism constitutes a physical support for the newly defined lower end portion of the tubing, i.e., the portion now to be filled with fluid material, so as to avoid undue stress on the tubing during the filling operation. Sixth, the same mechanism serves to introduce a predetermined amount of slack into the fresh lower end portions of the tubing to permit spreading or bulging out of the tubing as the fluent material is introduced into it to particularly facilitate formation of neat, compact individual packages without waste of packaging material. And finally, the mechanism serves to release the fluent filled lower end portion of the tubing so that the weight of the fluent material may be utilized as the advancing force for bringing fresh increments of tubing into proper position. With this brief explanation of the functions of the mechanism 84, the specific mechanisms provided for attaining the functions will be more readily understood, with reference to the following detailed description.

As shown in FIGURE 20, the mechanism 84 comprises a horizontally disposed rectangular frame 155 which is slidably guided on the lower end of the sub-frame 86 for vertical reciprocation relative to the sub-frame. Specifically, the rectangular frame 155 is provided at each edge thereof with a pair of vertical guide rods 156 which enter into complemental guide holes in the bottom of the sub-frame 86. The mechanism frame 155 is supported on the sub-frame by a pair of reciprocatory pneumatic or hydraulic motors 157 which are adapted to move the mechanism frame 155 upwardly and downwardly relative to the sub-frame through a relatively short stroke of movement, for example, about 2 inches. As indicated in FIGURE 1, the motors 157 are preferably double-acting so as to positively support the mechanism frame in adjusted position relative to the sub-frame.

Mounted in parallel relation to the front and rear transverse plates of the mechanism frame 155 are two sets 158 of relatively reciprocable combined grasping and sealing members, each set comprising (from the bottom up) a grasping jaw 160, a lower or first sealing element 161, an upper or second sealing element 162, and one-half 163 of a container supporting box. On one of the sets 158, suitably between the jaw 160 and the sealing element 161, there is mounted a bag spreading mechanism comprising a pair of spreader bars 164 normally biased inwardly toward one another by a tension spring 165 and each carrying a pair of spreader means 166, such as friction gripping means or bag engaging needles, the latter of which are illustrated herein. As shown in FIGURES 23 and 24, the needles 166 project forwardly from the respective bar 164 beyond the forward face of the sealing elements and grasping jaw of the respective member 158. The spreader bars 164 are slidably mounted on the upper surface of the adjacent jaw 160 and are slidably retained thereon by headed studs 167 fitting within keyhole slots 168 in the jaw. At their outer ends, the spreader bars 164 extend outwardly through slots in the side members of the mechanism frame 155 and at their outer ends carry rollers 169 for cooperation with cam 170 mounted on the exterior of the respective side member of the frame.

In use, as the jaws 160 are moved inwardly toward the center of the frame 155, as by means of respective pairs of double-acting hydraulic or pneumatic reciprocatory motors 171, the needles 166 initially engage the tubing material adjacent its marginal edges and the rollers 169 then engage the cams 170, whereby the needles are shifted outwardly to spread the tube laterally outwardly and thus flatten it, at least to a preliminarily acceptable degree.

As illustrated particularly in FIGURES 23 and 24, one of the grasping jaws 160 is preferably movably mounted relative to its respective set 158, and normally urged outwardly by springs 172 whereby the one grasping jaw will support the tubular material as it is being spread or flattened by the needles 166, after which both jaws will engage the tubing after the needles but before the sealing elements, so as to complete the flattening operation and secure a firm grip on the tubing before the sealing operation commences.

The two sealing elements 161—161 and 162—162 of each sealing assembly are comprised respectively of a pressure or backing bar, having a preferably resilient cushion on its sealing face (as shown at the left in FIGURES 23 and 24), and an electrically heated sealer (shown at the right) constructed in general accord with the detailed description of the probe hole sealing element 140. The particular purpose of a resilient backing cushion is to accommodate pressure application of the sealing elements to the tubular material whereby to squeeze liquid within the tube and on the tube wall out of the seal area and facilitate formation of an effective reliable seal across the full width of the tube.

The transverse tube seals may be straight line seals, as shown in FIGURE 47, or may have a configuration thereto, as shown in FIGURE 48, for any of a variety of purposes. It is a particular object of the illustrated apparatus to form the probe hole in what will ultimately be the selvage area between two completed packages, and the transverse seals are shown as being effected immediately above and below a probe hole. By suitably configuring the seals about the probe hole, as shown in FIGURE 48, material waste is maintained substantially non-existent and an extremely attractive package is provided.

It is also to be appreciated that if the transverse seals are formed immediately above and below the probe hole, which is illustrated as preferred, separate sealing of the probe hole may, at least in some instances, be omitted without detriment.

Mounted in the space between the sealing elements 161 and 162 of each set are comparable elements of a cut-off mechanism, which is illustrated herein as being of the hot wire type. As shown at the right in FIGURE 23, a wire or band 173 is carried on a mounting block in essentially the same structural assembly as the sealers 161 and 162, with the wire disposed for cooperation with an opposed resilient cushion 174. The wire or band is preferably impulse heated, particularly when the apparatus is employed for packaging liquids. Specifically, the sealing element 173 is moved into firm engagement with the backing cushion 174, and the wire then energized momentarily at high voltage. This actually melts the tubular material at the cut-off point, and thus forms a bead seal at each side thereof, whereby the seals formed by the elements 161 and 162 are supplemental by a parallel seal at the edge of the respective package. In lieu of the wire 173, a simple mechanical cut-off or knife could be provided, but the supplemental bead would not then be obtained.

If desired, and such structure is shown herein as preferred, the upper sealing elements 162 and the cut-off elements 173 and 174 may be mounted for movement separately of the elements 160, 161 and 166 to facilitate performance of the various functions attributable to the mechanism 84. For this purpose, the elements 162, 173 and 174 are adapted to be moved toward and away from the center of the framework 155 by separate pairs of double-acting air or hydraulic motors 175.

In use of the mechanism, incremental advancement of the tubing material under the weight of the fluent material in the lower end of the tubing will cause the tubing to gravitate downwardly between the spread-apart sets of members 158, as shown in FIGURE 23, to dispose all of the fluent material below the members 158 and to bring the sealed probe hole into the horizontal plane of the spreader needles 166 and the cut-off 173. Thereafter, the motors 171 and 175 are operated in sequence to move the jaws 160, sealing elements 161 and spreader needles 166 toward the tubing whereby the tubing is first spread laterally outwardly, flattened and finally clamped between the two jaws 160. Almost conjointly with the latter action, the lower right-hand sealing element 161 moves into engagement with the tube and squeezes the tubing flat between the two elements 161 for sealing off the upper end of the now fully defined and fluent filled package depending below the mechanism 84. At about the same time, the upper sealing elements 162 are moved into engagement with opposite sides of the now flattened tubing to effect a seal transversely across the tubing, which seal constitutes the bottom seal of the next package to be formed. And immediately thereafter, the wire 173 is energized (preferably only intermittently) at high voltage to melt through the tubing material, thereby forming bead seals at the upper end of the lower package and the lower end of the next package, and to sever the lower fluent filled and completely formed package from the remainder of the tubing.

It is to be particularly noted that the spreading needles 166 and the cut-off wire 173 act upon the area of the tubing containing the probe hole and between the two sets of transverse sealing elements 161 and 162 so that the portions of the container actually holding the fluent material are not perforated, damaged or marred in any way. The two transverse seals are made immediately to opposite sides of the probe hole, as shown in FIGURES 47 and 48, and the wire 173 cuts centrally across the hole, whereby one half of a probe hole appears in each selvage edge of the container material, where it can do no harm and does not detract from the neat appearance of the package. Also, there is no wastage whatever of container material, as is particularly evident from the disclosure of FIGURES 47, 48 and 51.

After sealing and severing have taken place in the manner described, the motors 171 are energized to retract from the tubing the jaws 160, sealing elements 161, and needles 166, whereby the completely formed package depending from the mechanism 84 is released from said mechanism for gravitational descent into a suitable packaging area, or directly into a paperboard or like container for the flexible fluent filled package. This operation is represented in FIGURE 51.

It is a particular object of the invention to make and box fluent filled package in the form of a pillow and to this end the two box halves 163 are provided. Specifically, each half comprises an upwardly and outwardly inclined base portion and a side wall extending upwardly from said base portion. When the two halves are brought together, as shown in FIGURES 24 and 25, the inclined portions diverge upwardly from substantially a common apex and the side walls are disposed fairly close together to confine the tube against spreading in the direction normal to the walls and to cause spreading in the direction parallel to the walls, whereby to restrict the tubular material as it is being filled to an essentially pillow shape. Subsequently, when the filled package is disposed below the end seal assembly 84, as shown for example in FIGURE 25a, the package is again positioned between inclined vanes 176 which serve to maintain the package in said pillow shape while it is top sealed and severed and as it drops into a box or other case.

When the filled and sealed bag below the end seal and cut-off assembly has been released by retraction of the sealing elements 161 and clamping jaws 160, the sealing elements 162 remain engaged with the tubing and the seamed portion of the tubing is physically retained within a slot-like opening in the bottom of the box now formed by the two box halves or elements 163. At this time, the vertical reciprocatory motors 157 are supplied with fluid under pressure to raise the entire frame 155 and the elements supported thereby upwardly through a short distance, say two inches, thereby to relax the tubing at the lower end portions thereof to accommodate bulging of this portion as fluent materials are subsequently introduced into the tubing. After the filling operation has been completed, essentially as depicted in FIGURE 24, the motors 175 are energized, in timed relation to the filling probe mechanism 80 and the probe hole sealing mechanism 82, to cause separation of the cut-off elements 173–174, the sealing elements 162 and the box halves 163 and accommodate gravitational descent therebetween of the filled lower end portion of the tubing. The motors 157 are again energized to lower the frame 155 thereby to bring the spreader needles 166 and cut-off wire 173 into the proper position relative to the probe hole now moved into alignment with the mechanism 84.

Having thus described in detail the individual components and the individual operation of the same in the first embodiment of the apparatus of the invention, the complete and continuous sequence of operation of this apparatus will be clear from the following brief summary of the sequence of operations performed by the complete apparatus, particular reference being made in this respect to FIGURES 25a, 25b and 25c.

Step 1 (FIGURE 25a)

When a filled bag B-1 is in lowered position, the forward nip roll 72 is braked at 74. The rearward nip roll 64 is then released, at which time the dance roll 68 immediately starts traveling down to draw a new length of film off the roll 60. At this point, the probe 124–125 moves in and the pump is started to supply fluent material into the interior of the mandrel 76 and the container material tubing. The probe hole sealer 140–141 is also moved in and the double bar end seals 158 are moved in to seal the upper end of the first bag B-1 and the lower end of the second bag B-2 and to sever the bag B-1 from the tubing. When the end seals are in, the whole end section 84 is elevated about two inches.

Step 2 (FIGURE 25b)

After the end seal section is elevated to relax the film, to allow it to fill out as it is being filled with fluent material, filling proceeds until the next bag B-2 is approximately ¾ full. At this time, the dance roll has traveled down the lower limit of its movement, festooning in a loop the increment of tubing that is required for the next fill. The dance roll mounting blocks then trip a microswitch, which releases the pressure on the cylinders, and the dance roll is backed off about 2 to 3 inches by the springs 106 to relax the tubing so that it will not affect weighing of the portion of tubing now being filled. Also, the jaws 160 and sealing elements 162 are backed off by the cylinders 171 to release the bag B-1 for gravitational descent into a shipping container (FIGURE 51). If the lower bag B-1 does not drop off, a time delay switch will stop the pump until drop-off is completed. When the bag B-1 does drop, the balance beam 56 will return to re-set position, which will override the time delay switch and permit filling of bag B-2 to be completed. When the balance beam senses that the proper weight of fluent material has been delivered into the portion of the tubing defining bag B-2, the pump will stop, whereupon the probe member 125 will seal off the filling tube to prevent further supply of fluent material to the tubing. During the filling operation, the sealing mechanism 82 is energized to seal off the probe hole that was made in the tubing during the filling of bag B-1.

Step 3 (FIGURE 25c)

When bag B-2 is filled and the pump is stopped, the filling probe 124–125 will be retracted by the motor 132, the probe hole sealer 82 will open, the sealing elements 162 and the cut-off members 173–174 will be retracted, and the end seal section 84 will simultaneously lower. The forward nip roll 72 at this point will be released and the rearward nip roll 64 braked, whereupon the filled bag B-2 will travel down, taking the festooned loop of tubing with it, thereby raising the dance roll to full height, at which point the roll or its mounting blocks will trip another microswitch, which in turn will again lock the forward nip roll and release the rearward nip roll. At this time, the cycle will start over.

Control circuitry for proper sequencing is not illustrated herein as the same may be entirely conventional and therefore obvious to those skilled in the art. Likewise, it will be apparent that the various functions can be performed with electric or mechanical operating means as well as the pneumatic or hydraulic means illustrated.

From the foregoing description, it is thus seen that the apparatus in a continuous manner forms, fills, weights, and discharges individual packages of fluent material. At no time during the operation need the tubing be handled manually, and the entire filling takes place within a completely closed circuit, so that the apparatus is ideally suited for the sanitary formation of fluent filled packages, particularly for food products, pharmaceuticals, etc. As previously noted, the tubing may be supplied to the apparatus in prefabricated form in a roll (as illustrated in the drawings). Alternatively, the apparatus could be supplied with one or two sheets of flat film, either from rolls or from film forming apparatus, and the flat sheet or sheets could be formed into tubing directly during their passage through the forming and filling apparatus. Similarly, the apparatus of this invention could directly receive the output of tubular film forming extruder apparatus, should that be desired. The film may be pre-perforated per FIGURES 49 and 50 if desired, and such perforating could be effected directly within the apparatus of the invention. Also, probe hole sealing could be eliminated if desired, and the end seals alone serve to seal the package. As indicated by FIGURES 47 and 48, the end seals may take a variety of forms. In any event, the apparatus of the invention is fully compatible with other apparatus utilized in the film forming and handling fields, and provides a convenient, economical and practical manner for automatically forming and filling packages of fluent materials.

Referring now to FIGURES 26a, 26b, 26c and 26d, a modification of the apparatus of FIGURES 1 to 25 is shown which is characterized by means for physically patching the probe hole rather than sealing the tubing to itself about the probe hole. The entire patching apparatus is simply a replacement for the probe hole sealer 82, and therefore all the rest of the apparatus components are indicated by the same reference numerals as employed in FIGURES 1 to 25.

The particular advantage of patching the tubing is that the probe hole can then be located anywhere on the resultant package or bag and is not restricted to location in the cut-off or selvage area as is otherwise desirable. Also, the patching apparatus accommodates token or temporary closing of the probe hole until final sealing at the ends.

As shown in FIGURE 26, the patching apparatus, which is indicated generally at 182, is preferably comprised of a floating mandrel 183, a mandrel support frame 184, a patch applying sealer 185, a motor 186 for moving the sealer into and out of engagement with the tubing material reaved over the mandrel, a roll 187 of patching material, means indicated generally at 188 for advancing a patch length of the material to the sealer, and a knife 189 for cutting the patch from the supply roll when the sealer moves toward the tubing supported by the mandrel 183.

Essentially two types of patches may be applied, namely (a) a thermoplastic sheet compatible with the container material, e.g., a polyethylene, and adapted to be heat sealed thereto, and (b) an adhesive surfaced or pressure sensitive tape or sheet adapted to be pressed onto the tubing material.

For heat-sealed application of a thermoplastic patch, the mandrel 183 and its support 184 may be identical to the mandrel 76 and its support, except that the mandrel need not be hollow or apertured; and the sealer 185 may be essentially the same as the sealing element 140 previously described.

For application of a pressure sensitive adhesive patch, the mandrel is not necessary and may be replaced by a simple backing plate, and the sealer 185 may simply comprise a pressure plate.

In either event, operation of the apparatus is essentially the same as described in conjunction with FIGURE 25, that is:

As shown in FIGURE 26a, a filled bag B–1 has moved down below the end sealer 84 to dispose a fresh length of container material over the mandrel 76 opposite the filling probe 80 and to dispose the previously probed area over the mandrel 183 opposite the sealer 185, whereupon the end sealer closes to seal the upper end of bag B–1 and the lower end of a fresh bag B–2, and to sever bag B–1 from the container material. When the end seals are in, the end seal section is raised to relax the film for filling thereof.

The probe 80 and the sealer 185 then move in toward the container material, as shown in FIGURE 26b. As the sealer 185 moves inwardly, it engages and carries with it an approprite length of patching material previously fed downwardly from the supply roll 187. As the sealer passes the knife 189, the single patch is severed from the supply and moved into surface contact over the probe hole area of the container material supported by the mandrel 183. If the path is thermoplastic, the sealer 185 is energized to seal the patch to the container material to close the previously made probe hole.

The completed bag B–1 is then released by opening the lower part of the end seal assembly 84, filling of bag B–2 to gravitate downwardly and draw out a fresh length of film (FIGURE 26d). During this time, mechanism 188 feeds a fresh length of patching material in front of the sealer 185, and the apparatus thereupon is conditioned for repetition of the described cycle as shown in FIGURE 26a.

Since the patch now closes the probe hole without disrupting the tubular configuration of the container material, the patched probe hole may constitute part of the wall of the completed package, and it is not necessary therefore to end seal to opposite sides of the probe hole. By way of example, in FIGURE 26, the end sealer is illustrated as spaced below the patching apparatus 182 by a distance greater than the incremental advance of the container material and each of bags B–1 and B–2 is illustrated as having a patch thereon—note P–1 and P–2, respectively. If desired, of course, the patch could be located in the selvage area.

Referring now to FIGURES 27 through 42, a second embodiment of the apparatus of the invention is illustrated, which is quite similar to the first except that the package instead of being formed and filled during three positions of arrested movement of the film, is formed and filled in two such positions. Due to the similarity of the two embodiments, the same reference numerals as previously employed, with addition of the suffix "a," are utilized in FIGURES 27 through 42 to indicate elements that are the same as or similar to those already described.

As shown in FIGURES 27 and 28, the second embodiment of the apparatus of the invention includes a frame 50a essentially the same as the frame previously described, the rearward leg portions of the frame not being shown inasmuch as they provide the same film supporting and feeding arrangement as previously described, witness particularly FIGURE 42. The front legs 54a of the frame provide a guide for a weight mechanism sub-frame 86a, which is supported on the outer end of a balance beam 56a in the same manner as above described. Mounted on the sub-frame 86a is a film advancing brake roll 72a and brake 74a, essentially identical to the previously described brake assembly.

In the present embodiment of the invention, the filling probe mechanism 80a is disposed quite some distance below the brake or nip roll 72a and is mounted on a support 81a which is independent of the mandrel support 78a. This particular mounting accommodates provision of a vertically reciprocable mandrel support 78a (which is slidably guided on the sub-frame 86a) and the interposition between the nip roll 72a and the mechanism 80a of reciprocatory hydraulic or penumatic motors 79a for moving the mandrel support 78a upwardly to a position above the mechanism 80a and downwardly to a position in alignment with the mechanism 80a.

Specifically, as shown in FIGURES 30 to 32, the support 81a for the filling probe mechanism 80a may suitably be defined by a pair of horizontal plates disposed to opposite sides of and extending between the side members 108a of the sub-frame 86a. Interiorly of the support plates 81a, the support 78a may be comprised of a pair of horizontally disposed parallel plates provided at their ends with L-shaped guides 77a which are notched at their outer ends for slidable guidance on the side members 108a and that have connected thereto the piston rods of the motors 79a.

Mounted centrally on the inner surfaces of the horizontal plates of the support 78a are a pair of channels 115a which, as before, serve to rotatably mount the upper guiding rollers 116a and lower guide wheels 116b and the guiding wheels 117a for the hollow mandrel 76a. Also as before, the mandrel 76a is provided with rollers 114a which serve to support the mandrel interiorly of the upper rollers 116a and lower guide wheels 116b and wheels 117a.

In the present embodiment of the apparatus of the invention, the hollow mandrel 76a is not provided simply with a hole in one wall thereof, but is provided with an elongate downwardly open slot 118a in the wall thereof facing toward the filling probe mechanism; and the intervening plate of the support 78a is similarly provided with a downwardly opening elongate slot 119a.

The filling probe mechanism 80a is essentially identical to the filling probe mechanism previously described, including a supporting framework 120a fixed to the support 81a, guide rods 121a within the framework, a carriage 122a slidably mounted on the rods, a fill chamber 123a on the carriage, and a fill tube 124a projecting toward the mandrel from the lower end of the chamber. Slidably mounted within the tube 124a is a combined probe and valve member 125a, normally biased rearwardly and adapted to be forced open by the pressure of fluent material supplied by a pump to the fill chamber 123a. However, in the present embodiment, the retaining collar 129a is not biased toward the mandrel by a spring, but is frictionally mounted on the fill tube 124a, suitably by a pair of friction members, such as O-rings 130a.

The second principal distinction between the second and first embodiments of the apparatus of the invention, i.e., in addition to the vertically reciprocable mandrel support, is the incorporation of the probe hole sealing mechanism directly with the filling probe mechanism. Specifically, the retaining collar 129a is provided with an enlarged head on which is mounted an annulus 149a of Teflon or a like material whereby the enlarged head 141a of the retaining collar serves as a base plate for the probe hole sealing mechanism. Mounted on the support 81a in juxtaposition to the filling probe 124a–125a is a probe hole sealing element 140a, which is preferably identical to the element 140, with the exceptions that the central plunger is omitted and that the element 140a is mounted for reciprocation toward and away from the tubing by means of a reciprocatory hydraulic or pneumatic motor 152a.

In use and operation, particularly as shown in the sequence illustrations of FIGURES 37 through 41, the mandrel 76a and its supporting frame 78a are initially disposed in horizontal axial alignment with the filling probe 124a–125a. When a fresh increment of tubing has been moved into place about the mandrel, the motor 132a is energized to move the filling probe toward the mandrel. The retaining collar 129a being frictionally held in place on the surface of the filling tube 124a is simultaneously advanced until the pad 149a on the free end thereof is brought into engagement with the tubing to force the tubing firmly against the surface of the mandrel and to effect a seal between the retaining collar, the tubing and the mandrel. As in the prior embodiment of the invention, the collar also serves to retain the tubing in a taut condition in the area thereof extending over the slot 118a within the area defined by the annulus 149a.

The motor 132a continues to advance the filling probe until the probe member 125a pierces through the tubing and the members 124a and 125a both pass through the slot 118a into the interior of the mandrel 76a and the container tubing. The motor 132a is then stopped, and the pump for the fluent material is started to force fluent material under pressure into and through the fill chamber 123a and the fill tube 124a, thereby forcing the combined probe and sealing member 125a further into the interior of the mandrel to open the fill tube and accommodate discharge of fluent material into the interior of the mandrel and the interior of the tubing. Filling continues in the same manner as previously described until a predetermined amount of fluent material has been discharged into the container tubing.

When the balance beam 56a determines that the proper amount of fluent material has been fed into the tubing, the pump is stopped and a spring (such as spring 190 shown in FIGS. 11 and 14) associated with the probe 125a thereupon moves the probe to closed, sealed position on the end of the tube 124a as in the embodiment previously described. Then the motors 79a are energized to raise the frame 78a and the mandrel 76a upwardly to a position spaced above the filling probe, as illustrated particularly in FIGURE 39. (Also see FIGURES 35 and 36.) Upward movement of the frame 78a and the mandrel 76a in the manner described are accommodated by virtue of the slotted aperture 118a in the mandrel and the slotted aperture 119a in the frame 78a, whereupon the components of the machine attain the relative positions depicted in FIGURE 39.

Figure 41:
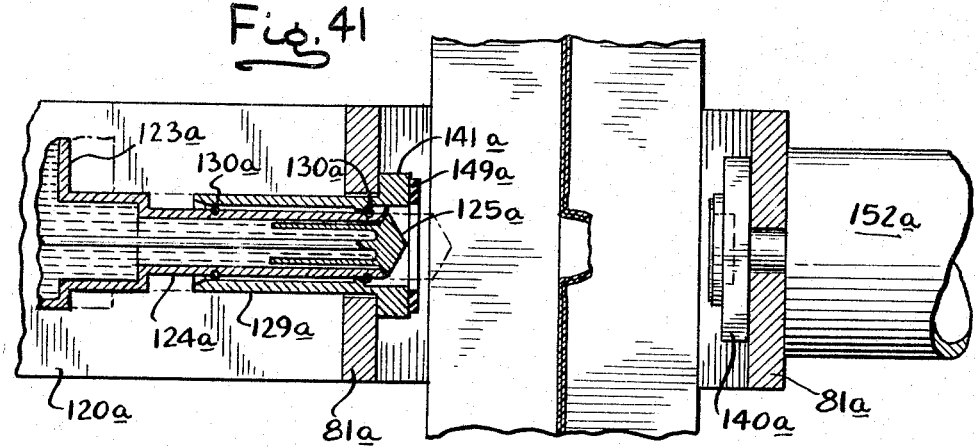

When the mandrel and its supporting frame have been fully elevated, as sensed for example by microswitches associated with the frame 78a, the sealing element motor 152a is energized to move the sealing block 140a inwardly into engagement with the tubing to confine the tubing firmly between the sealing element 140a and the insulating annulus 149a forming the face of the head 141a. Then, the sealing ring 146a may be energized for a short period of time in the same manner as previously described to effect an annular seal about the probe hole made in the tubing by the filling probe mechanism. The relative positions of the components of the machine in performance of this function are illustrated in FIGURE 40, from which it will be noted that the filling probe remains in its filling position, and retains the block 141a in filling position, with the exception that the combined valve and probe member 125a has been moved to closed position by its spring as a consequence of discontinuance of the pumping of fluent material. After the annular seal about the probe hole has been effected, the motors 152a and 132a are energized to return both the sealing element 140a and the filling probe mechanism to their initial positions, as illustrated in FIGURE 41. During retracting movement, the retaining collar 129a initially moves rearwardly, i.e., away from the tubing, conjointly with the fill tube 124a until the head 141a of the collar engages the framework 81a, whereupon the collar is arrested and the fill tube continues its retracting movement to dispose the fill tube and the combined valve and probe member 125a within the confines of the retaining collar.

After the probe hole sealing means and the filling probe mechanism have been fully retracted from the tubing, the mandrel and its supporting frame are returned to their initial positions, individually or conjointly with incremental feeding of fresh tubing, to return the mandrel to its initial position as shown in FIGURE 37, whereupon the apparatus is conditioned for repetition of the described cycle of operation.

As with the embodiment of the invention first described herein, the filling probe may directly pierce through the tubing material, or the tubing material may be pre-perforated, as exemplified in FIGURES 49 and 50, to facilitate entry of the probe into the interior of the tubing To complete the embodiment of the apparatus shown in FIGURES 27 through 42, the sub-frame 86a is provided at its lower margin with an end sealing and cut-off mechanism 84a which is spaced below the filling probe mechanism by a distance equal to the longitudinal incremental advance of the tubing, whereby the probe hole made in the tubing in a first operation will be disposed adjacent the end sealing mechanism in the next operation, i.e., the next time the tubing is arrested. The end seal mechanism 84a of the second embodiment of the invention is preferably identical to the end seal mechanism previously described herein. Accordingly, all of the elements thereof are indicated by the same reference numerals as previously employed with the suffix "a."

The sequence of operations performed automatically by the second embodiment of the apparatus of this invention is depicted schematically in FIGURES 42a, 42b, and 42c, and is essentially as follows:

*Step 1 (FIGURE 42a)*

When a filled bag B–1 is in the lowered position, the forward nip roll 72a is braked at 74a. The rearward nip roll 64a is then released, at which point the dance roll 68a starts traveling down to draw a new length of film off the roll 60a. At this point, the probe 124a–125a moves in and the pump is started to supply fluent material into the interior of the mandrel 76a and the container material. The double bar end seals 158a are moved in to seal the upper end of the first bag B–1 and the lower end of the second bag B–2 and sever the bag B–1 from the tubing. When the end seals are in, the whole end seal section 84a is elevated about two inches.

*Step 2 (FIGURE 42b)*

After the end seal section is elevated to relax the film, to allow it to fill out as it is being filled with fluent material, filling proceeds until the next bag B–2 is approximately ¾ full. At this time, the dance roll has traveled down, festooning in a loop the new increment of tubing that is required for the next fill. The dance roll mounting blocks then trip a microswitch, which in turn releases the pressure on the cylinders and the dance roll is backed off about 2 to 3 inches by the dance roll springs to relax the tubing, so it will not affect weighing of the portion of tubing now being filled. Also, the lower sections of the sealing sets 158a are backed off by the cylinders 171a to release the bag B–1 for gravitational descent into a shipping container. If the lower bag B–1 does not drop off, a time delay switch will stop the pump until drop-off is completed. When the bag B–1 drops, the balance beam 56a will return to re-set position, which will override the time delay switch and permit filling of bag B–2 to be completed.

When bag B–2 is filled, the motors 79a will operate to raise the support 78a and the mandrel 76a upwardly away from the filling probe 124a–125a. When this movement is completed, the sealing element 140a is moved in to effect an annular seal about the probe hole.

*Step 3 (FIGURE 42c)*

When probe hole sealing has been completed, the filling probe 124a–125a is retracted by the motor 132a, and the sealing element 140a is retracted by the motor 152a. Thereafter, the upper sealing bars and cut-off means are retracted, and the end seal section 84a is simultaneously lowered. The forward nip roll 72a is then released and the rearward nip roll 64 braked, whereupon the filled bag B–2 will travel down, taking the festooned loop of tubing with it, thereby raising the dance roll to full height, at which point the roll will trip a microswitch, which in turn will again lock the forward nip roll and release the rearward nip roll. During the incremental advance of the tubing, the mandrel 76a and its support 78a are simultaneously lowered by the motors 79a back into alignment with the filling probe and probe hole sealing mechanisms. When both the dance roll and mandrel are returned to initial position, as determined for example by microswitches, the apparatus is conditioned for and automatically will commence performance of another cycle as above described.

Thus, it is apparent that the second embodiment of the invention, like the first, automatically and continuously forms individual fluent filled pillow-like packages. The operation is entirely sanitary, so that the apparatus may be utilized for the sanitary packaging of a wide variety of materials, such as food products and pharmaceuticals. As previously indicated, the apparatus is adapted for use with preformed tubing supplied to the apparatus in roll form; the apparatus may directly incorporate means for forming one or two films of plastic sheeting into tubing, or may be associated directly with means for extruding plastic tubing.

Referring now to FIGURES 43 to 46, a third embodiment of the apparatus of the invention is illustrated which is especially adapted for substantially continuous high speed operation. The elements of this embodiment of the invention are quite similar to elements of the previously described apparatus, and are therefore indicated by the same reference numerals with the suffix "b."

The apparatus includes a main frame 50b mounting thereon a balance beam 56b, both the same as previously described. In this embodiment, the film is not fed incrementally under the influence of gravity on the filled bag and the festooning components 66, 68 and 70 are therefore omitted. However, it is desirable to provide means for controlling or at least retarding adavnce of the tubular container material and a brake or retarder 74b similar to the brake 74 is mounted on a sub-frame 86b in the same manner as previously described.

In this embodiment of the invention, the entirety of the apparatus comprised of the holow mandrel 76b, the filling probe 80b and the end sealer 84b (and also a probe hole sealer or patcher if desired or required) are mounted for vertical reciprocation, and especially for conjoint downward movement with the container material during the time the container material is being filled with fluent material and sealed. To accommodate such movement of the filling and sealing apparatus, the same is mounted on a secondary sub-frame 81b which is reciprocably guided on the sub-frame 86b and adapted to be reciprocated relative thereto by a pair of hydraulic or pneumatic motors 79b.

The mandrel 76b, the mandrel support and the filling probe mechanism 80b may suitably be identical to the physical construction described in detail with reference to FIGURES 1 to 25, so that no further explanation of those elements is required.

Similarly, the end seal assembly 84b is preferably identical to the seal assembly 84 described in conjunction with FIGURES 1 to 25 so that no further explanation of the same is necessary. However, it is noted that the sealing, clamping and cut-off members are movable by respective motors 171b and 175b and that the end seal assembly is movable relative to the sub-frame 81b by motors 157b to accommodate introduction of slack into the tubing in the area between the filling probe and the end seal to facilitate the filling operation. Also, bag confining box halves 163b and inclined vanes 176b are preferably provided to insure definition of a pillow-shaped package.

In like manner, if a probe hole sealer such as shown at 82 in FIGURES 1 to 25, or a probe hole patcher as shown at 182 in FIGURE 26 were required or desired, the same could be added by increasing the length of sub-frame 81b and inserting the same between the filler assembly 80b and the end seal assembly 84b in the manner manifest from FIGURES 1 through 26. Also, if a probe hole sealer such as described in conjunction with FIGURES 27 to 42 were desired, the foregoing description renders obvious to those skilled in the art the manner of making such addition to the machine of FIGURES 43 to 46.

Referring to FIGURE 46, there is illustrated in six sequential stages the cycle of operations performed by the machine shown in detail in FIGURES 43, 44 and 45; the chain-line in FIGURE 46 outlining or representing the movable sub-frame 81b. In the initial stage shown in FIGURE 46a, the frame 81b is in its uppermost position, a filled bag B–1 is disposed below the end sealer 84b and the motors 171b have moved the lower sections of the end sealer into engagement with the bag to seal its upper end; the bag being maintained in pillow-shape by the inclined vanes 176b.

The filling probe and the remainder of the end seal assembly then move inwardly to seal the lower end of a second bag and sever the first bag from the container material, whereupon the filling operation is commenced, see FIGURE 46b. As soon as the probe has engaged the container material or starts its fill, the sub-frame 81b is started on a downward stroke of movement by the motors 79b, whereupon the sealed engagement between the probe, the container material and the mandrel 76b causes the container material to be moved downwardly conjointly with the sub-frame 81b (FIGURE 46c). Such movement may be facilitated by automatic release of the brake 74b, or the brake may maintain a predetermined drag on the container material which drag is overcome as the frame moves down under the urge of the motor 79b. As downward movement of the frame and tubing commences, the end sealer 84b is raised slightly on the sub-frame by the motors 157b to introduce slack into the container material to facilitate proper filling of the bag. Throughout the complete filling period, the tubing is lowered as filling takes place so that these two essential functions occur simultaneously rather than sequentially, with significant saving of time.

Also, as filling proceeds, the lower sections of the end seal assembly may open to release the completed bag B-1 and to facilitate weighing out of a predetermined amount of fluent material into the bag B-2 now being formed in the box 163b and supported by the balance beam 56b (see FIGURE 46d).

When filling has been completed, the upper sections of the end sealer are opened and the probe is withdrawn from the mandrel (FIGURE 46e) whereupon the bag B-2 is released and the frame 81b is retracted rapidly upwardly by the motors 79b to dispose the end sealer above bag B-2 and opposite the probe hole formed in the preceding fill cycle, the end sealer in the interim having again been lowered on the frame 81b (FIGURE 46f) so that the apparatus is conditioned for repetition of the above described cycle.

If desired, relative movement between the frame and the container material may be accomplished by braking the container material and elevating the frame 81b, or by a composite of upward movement of the frame and controlled downward descent of the filled lower end of the material against the drag of the brake or the retarder 74b. In any event, non-filling time is reduced to a minimum so as to maintain production of fluent filled bags at a maximum.

In the apparatus of FIGURES 43 to 46, no probe hole sealing or patching apparatus has been shown and sealing is suitably effected simply by end seals above and below the probe hole, as illustrated for example in FIGURES 47 and 48.

Thus, the apparatus of FIGURES 43 and 46 has been shown to accomplish in a high speed manner the essential advantages and results of the apparatus of FIGURES 1 through 42, i.e., automatic forming and filling of pillow-shaped packages of fluent materials.

While the preferred embodiments of the invention have been described herein in conjunction with thermoplastic film materials, it is to be appreciated that the invention, with appropriate modifications, may be applied to a wide variety of flexible container materials.

In view of the foregoing description, it is manifest that all of the objects and advantages of the invention have been shown herein to be attained in a convenient, economical and practical manner.

While I have shown and described what I regard to be preferred embodiments of the apparatus of my invention, and the preferred modes of practicing the process of my invention, it is to be appreciated that various changes, rearrangements and modifications may be made therein without departing from the scope of the invention, as defined by the appended claims.

I claim:

1. A process of continuously forming and filling flexible containers comprising: drawing a length of tubular container material about a mandrel formed with a passage therethrough; sealing the material at a portion thereof spaced from the mandrel; passing a filling probe through another portion of the material and into the mandrel passage into communication with the interior of the tubular container material; introducing fluent material through the probe; withdrawing the probe from the mandrel and said other portion of the container material; and sealing the container material about said other portion thereof.

2. A process of continuously forming and filling flexible containers comprising drawing a length of tubular container material about a mandrel formed with a passage therethrough, sealing the tube at one side of the mandrel, inserting a filling probe through a defining wall area of the container material and into the mandrel passage, directing fluent material through the probe into the tubular container material through said mandrel, withdrawing the probe from the mandrel and the container material, and subsequently sealing the tube adjacent the probed opening.

3. A process of continuously forming and filling flexible containers comprising drawing a length of tubular container material about a mandrel formed with a passage therethrough, sealing the material at a portion thereof spaced from the mandrel, passing a filling probe through another portion of the material and into the mandrel passage into communication with the interior of the tubular container material, introducing fluent material through the probe, weighing the fluent material accumulating in the tubular container material, withdrawing the probe from the mandrel and said other portion of the container material when the container material contains a predetermined weight of fluent material, and sealing the container material about said other portion thereof.

4. A process of continuously forming and filling flexible containers comprising: drawing a length of flexible tubular container material about a mandrel formed with a passage therethrough disposed within the tube; sealing the tube at a portion thereof downstream from the mandrel in the direction of tube movement; inserting a filling probe through the container material and into the mandrel passage; directing a fluent material through the probe into the tube; relatively moving the mandrel, tube and probe; sealing the probe hole in the container material when it is clear of the mandrel; and subsequently sealing the tube at the portion thereof containing the sealed hole.

5. A process of continuously forming and filling flexible containers comprising: drawing a length of flexible tubular container material about a mandrel formed with a passage therethrough disposed within the tube; sealing the tube at a portion thereof downstream from the mandrel in the direction of tube movement; inserting a filling probe through the container material and into the mandrel passage; directing fluent material through the probe into the tube; relatively moving the mandrel, tube and probe; sealing the probe hole in the container material when it is clear of the mandrel; subsequently sealing the tube at the portion thereof containing the sealed hole along a pair of lines to opposite sides of said hole; and severing the tube between said seal lines.

6. A process of continuously forming and filling flexible containers comprising: intermittently drawing a predetermined length of flexible tubular container material about a mandrel formed with a passage therethrough disposed within the tube; while movement of the tube is arrested for a first time, sealing the tube at a first portion thereof downstream from the mandrel, inserting a filling probe through a second portion of the tube and into the mandrel passage, directing fluent material through the probe into the tube, and withdrawing the probe from the mandrel and the tube; while movement of the tube is arrested for a second time, sealing the probe hole in said second portion of the tube, sealing the tube at a third portion thereof intermediate said first and second portions, and repeating the filling operation at a fourth portion of the tubes; and while movement of the tube is arrested for a third time, sealing the probe hole in said fourth portion of the tube, sealing the tube at said second portion thereof, and repeating the filling operation at a fifth portion thereof.

7. A process of continuously forming and filling flexible containers comprising: intermittently drawing a predetermined length of flexible tubular container material about a mandrel formed with a passage therethrough disposed in the tube; while movement of the tube is arrested for a first time, sealing the tube at a first portion thereof downstream from the mandrel, inserting a filling probe through a second portion of the tube and into the mandrel passage, directing fluent material through the probe into the tube, moving the mandrel upstream relative to the direction of tube movement, sealing the probe hole in said second portion of the tube, and withdrawing the probe from the tube; and while movement of the tube is arrested for a second time, sealing the tube at said second portion thereof, and repeating the tube filling and probe hole sealing operations at a third portion of the tube.

8. Container filling apparatus comprising a mandrel for disposition thereabout of a tube of container material, said mandrel comprising means for spreading the tube open and a plate having an aperture therethrough extending into the spread portion of the tube, means exteriorly of the tube for supporting said mandrel, a filling probe juxtaposed to the aperture in said plate, and means for moving said probe into and out of said aperture through the container material disposed about said mandrel.

9. Container filling apparatus comprising a mandrel for disposition thereabout of a tube of container material, said mandrel comprising means for spreading the tube open and a plate having an aperture therethrough extending into the spread portion of the tube, means exteriorly of the tube for supporting said mandrel, a filling probe juxtaposed to the aperture in said plate, container material retaining means surrounding said probe, and means for moving said retaining means toward said plate to engage and hold the container material around said aperture between the retaining means and the plate and for moving said probe into and out of said aperture through the container material held between said retaining means and said plate.

10. Container filling apparatus comprising a mandrel for disposition thereabout of a tube of container material, said mandrel comprising means for spreading the tube open and a plate having an aperture therethrough extending into the spread portion of the tube, means exteriorly of the tube for supporting said mandrel, a filling probe juxtaposed to the aperture in said plate, said probe comprising a central filling tube of a size smaller than said aperture and a retaining collar of a size larger than said aperture slidably mounted on said filling tube, said collar normally enclosing and projecting beyond said filling tube, means for moving said probe toward said plate to engage and hold the container material between said collar and said plate and thereafter to move said filling tube through the material and into the aperture in said plate, and means for introducing fluent material through said filling tube into the tube of container material.

11. Container filling apparatus comprising a hollow mandrel for disposition thereabout of a tube of container material, a hole in one wall of said mandrel, a filling probe opposed to said hole, and means for moving said probe into and out of said hole through the container material disposed about said mandrel.

12. Container filling apparatus comprising a hollow mandrel for disposition thereabout of a tube of container material, a hole in one wall of said mandrel, a filling probe opposed to said hole, means for moving said probe into and out of said hole through the container material disposed about said mandrel, and a foam mitigating tube extending from one end of said mandrel for conveying fluent material from said probe and mandrel into the tube of container material.

13. Container filling apparatus comprising a hollow mandrel for disposition thereabout of a tube of container material, a hole in one wall of said mandrel, a filling probe opposed to said hole, means for moving said probe into and out of said hole through the container material disposed about said mandrel, and a series of tube flattening rods adjacent said mandrel for maintaining the tube flat adjacent the mandrel.

14. Container filling apparatus comprising a downwardly open hollow mandrel for slidable disposition thereabout of a tube of container material, a hole in one wall of said mandrel, a filling probe opposed to said hole, means for moving said probe into said hole through the container material disposed about said mandrel, means for feeding fluent material through said probe and said mandrel into the tube of container material, means depending below the mandrel for flattening a portion of the tube below the mandrel, means for relatively moving said mandrel and the tube of container material to dispose the probe hole in the container material below said mandrel, and sealing means associated with said flattening means for sealing the container material about the probe hole.

15. Container filling apparatus as set forth in claim 14, including an anti-foam fill tube depending from said mandrel to adjacent said sealing means.

16. Container filling apparatus comprising a hollow mandrel for disposition thereabout of a tube of container material; a hole in one wall of said mandrel; a filling probe opposed to said hole; sealing means including means surrounding said probe and cooperable means on the opposite side of said mandrel; and means for moving said probe into said hole in said mandrel through the container material disposed about said mandrel, means for moving said mandrel relative to said probe, means for engaging said sealing means with the opposite sides of the tube when said mandrel is relatively removed from said probe, and means for retracting said probe from the tube.

17. Container forming and filling apparatus comprising a hollow mandrel, means for guiding a tube of container material about said mandrel, a hole in one wall of said mandrel, a filling probe juxtaposed to said hole, means for moving said probe into and out of said hole in said mandrel and through the container material disposed about said mandrel, means for relatively moving the mandrel, tube and probe and means for closing the probe hole in the container material including means for engaging the tube about the probe hole in the container material.

18. In container forming and filling apparatus wherein a filling probe is inserted through the wall of thermoplastic container material; means for closing the hole in the container material through which the probe passed comprising a sealing block including a base, a sheet of insulating material on said base, a conductive ring on said insulating material, a pair of conductive leads mounted in insulated relation on said base radially inwardly of said ring, extending through said insulating material and connected to said ring, and a thin sheet of electrical insulating material overlying said ring and secured to said base; and means for engaging said block with the container material with the probe-hole disposed within said ring.

19. Container forming and filling apparatus comprising a vertically disposed hollow mandrel, means for guiding a tube of container material downwardly about said mandrel, means below said mandrel for sealing the tube, a hole in one wall of said mandrel, a filling probe juxtaposed to said hole, means for moving said probe into and out of said hole through the container material disposed about said mandrel, means for introducing fluent material through the probe into the tube, means above said mandrel for releaseably holding the tube against movement, and means responsive to removal of the probe from the tube for releasing the latter means to accommodate predetermined gravitational descent of said tube under the weight of the material in the tube to dispose the hole through which the probe passed adjacent said means for sealing said tube, the latter including means for sealing the tube above and below the hole.

20. In container forming and filling apparatus as set forth in claim 19, the means for sealing the tube comprising a pair of relatively reciprocable members movable toward and away from one another and including a pair of opposed jaws for grasping the tube therebetween, two vertically spaced pairs of sealing bars sequentially engageable and disengageable with the tube for first sealing the upper end of one container and then the lower end of the next container and for then first releasing said upper end of one container and then the lower end of said next container, and cut-off means between the latter two pairs of bars for severing the tube between the two seals.

21. In container forming and filling apparatus as set forth in claim 19, the means for sealing the tube comprising two pairs of vertically spaced relatively reciprocable members sequentially movable toward and away from one another a lower pair of said members including a pair of opposed jaws for grasping the tube therebetween and a pair of sealing bars engageable with the tube for first sealing the upper end of one container and an upper pair of said members including a pair of sealing bars engageable with the first tube for sealing the lower end of the next container and a cut-off element, and means for sequentially moving the two members toward one another to grasp the tube, make the two seals, sever the tube between the two seals, and to sequentially open partly to release said one container and subsequently open fully to accommodate relative movement of said next container.

22. In container forming and filling apparatus wherein fluent material is introduced into a relatively elevated portion of a vertically disposed length of continuous flexible tubing, means for sealing the tubing off into individual packages comprising a pair of members mounted for conjoint vertical movement and for relative reciprocation toward and away from one another from opposite sides of the tube, a pair of opposed tube grasping jaws on said members, two vertically separated pairs of sealing bars on said members above said jaws, cut-off means between said two pairs of bars, a pair of box forming elements on said members above said bars, and means for moving said members to close said jaws on the tube, effect two seals one at the upper end of one container and the other at the lower end of the next container, sever said one container from the remainder of the tubing, open partly to release said one container, raise upward to introduce slack in the tubing to facilitate filling of said next container while it is supported by said box forming elements, then separate fully to accommodate relative movement of said next container, and finally lower to the starting position of said members to accommodate repetition of said cycle of movement.

23. In container forming and filling apparatus wherein fluent material is introduced into a continuous tube of container material, means for flattening out and then sealing the tube into individual packages comprising a frame for passage therethrough of the tube, a pair of relatively reciprocable members mounted on said frame to opposite sides of the tube for movement into and out of engagement with the tube, spreader bars mounted on one of said members for movement generally parallel thereto, cooperable cam means on said frame and said bars for spreading the bars as said members are moved toward one another, means on said bars for grasping the tube and spreading the same as said members are moved toward one another, and flattening and sealing jaws on said members for engagement with the spread tube.

24. Container forming and filling apparatus comprising a hollow mandrel, means above said mandrel for guiding a tube of container material downwardly about said mandrel, means below said mandrel for sealing the tube transversely of its length, a hole in said mandrel, a filling probe juxtaposed to said hole, means for moving said probe into and out of said hole through the container material disposed about said mandrel, means for introducing fluent material through said probe into the mandrel and the tube, first releasable tube holding means upstream from said mandrel in the direction of tube movement normally preventing downward movement of the tube about said mandrel and accommodating gravity filling of portions of the tube below the mandrel, dancer means upstream from said first holding means for festooning a length of tube equal substantially to an increment of the distance between said mandrel and said sealing means, second releasable tube holding means upstream from said dancer means normally released from the tube to accommodate festooning of the tube, means responsive to removal of said probe from the tube and mandrel for applying said second holding means and releasing said first holding means to accommodate feeding of the festooned length of tube toward the mandrel under the gravitational influence of the material in the filled end of the tube, whereby a hole through which the probe passed is disposed adjacent said sealing means, said sealing means including means for forming a seal transversely of the tube both above and below said hole, and means for severing the tube between said seals across the hole.

25. Container forming and filling apparatus comprising a hollow mandrel, means above said mandrel for guiding a tube of container material downwardly about said mandrel, means below said mandrel for sealing the tube transversely of its length, a hole in said mandrel, a filling probe juxtaposed to said hole, means for moving said probe into and out of said hole through the container material disposed about said mandrel, means for introducing fluent material through said probe into the mandrel and the tube, first releasable tube holding means upstream from said mandrel in the direction of tube movement normally preventing downward movement of the tube about said mandrel and accommodating gravity filling of portions of the tube below the mandrel, dancer means upstream from said first holding means for festooning a length of tube equal substantially to one-half the distance between said mandrel and said sealing means, second releasable tube holding means upstream from said dancer means normally released from the tube to accommodate festooning of the tube, means responsive to removal of said probe from the tube and mandrel for applying said second holding means and releasing said first holding means to accommodate feeding of the festooned length of tube toward the mandrel under the gravitational influence of the material in the filled end of the tube, whereby the hole through which the probe passed in the preceding cycle is disposed adjacent said sealing means and the hole through which the probe passed in the instant cycle is disposed half way between the mandrel and the sealing means, said sealing means including means for forming a seal transversely of the tube both above and below the hole adjacent thereto, means for severing the tube between said seals across the hole, and means half way between said sealing means and said mandrel for making a seal within the margins of the tube in circumscribing relation to the probe hole adjacent thereto.

26. Container forming and filling apparatus comprising a hollow mandrel, means above said mandrel for guiding a tube of container material downwardly about said mandrel, means below said mandrel for sealing the tube transversely of its length, a hole in said mandrel, a filling probe juxtaposed to said hole, means for moving said probe into and out of said hole through the container material disposed about said mandrel, means for introducing fluent material through said probe into the mandrel and the tube, means for raising said mandrel above said probe, means comprising cooperable elements disposed to opposite sides of the mandrel with one element surrounding said probe for sealing the tube about the probe hole when the mandrel is raised above the probe, first releasable tube holding means upstream from said mandrel in the direction of tube movement normally preventing downward movement of the tube about said mandrel and accommodating gravity filling of portions of the tube below the mandrel and sealing of the tube about the probe hole, dancer means upstream from said first holding means for festooning a length of tube equal substantially to the distance between said mandrel and the first-named sealing means, second releasable tube holding means upstream from said dancer means normally released from the tube to accommodate festooning of the tube, means responsive to withdrawal of said probe and the second-named sealing means from the tube for applying said second holding means and releasing said first holding means to accommodate feeding of the festooned length of tube toward the mandrel under the gravitational influence of the material in the filled end of the tube, whereby the hole through which the probe passed is disposed adjacent said sealing means, said sealing means including means for forming a seal transversely of the tube both above and below said hole, and means for severing the tube between said seals across the hole.

27. Container forming and filling apparatus comprising a hollow mandrel, means for guiding a tube of container material about said mandrel, means below said mandrel for sealing the tube transversely of its length, a hole in said mandrel, a filling probe juxtaposed to said hole, means for moving said probe into and out of said hole through the container material disposed about said mandrel, means for introducing fluent material through said probe into the mandrel and downwardly into the tube, tube controlling means upstream from said mandrel in the direction of tube movement normally preventing downward movement of the tube about said mandrel and accommodating gravity filling of portions of the tube below the mandrel, scale means supporting said tube controlling means for weighing the fluent material accumulating in the tube, and means responsive to said scale means for discontinuing introduction of fluent material through said probe and for withdrawing said probe from the tube.

28. Container forming and filling apparatus comprising a hollow mandrel, means above said mandrel for guiding a tube of container material downwardly about said mandrel, means below said mandrel for sealing the tube transversely of its length, a hole in said mandrel, a filling probe juxtaposed to said hole, means for moving said probe into and out of said hole through the container material disposed about said mandrel, means for introducing fluent material through said probe into the mandrel and the tube, first releasable tube holding means upstream from said mandrel in the direction of tube movement normally preventing downward movement of the tube about said mandrel and accommodating gravity filling of the portions of the tube below said mandrel, scale means supporting said tube holding means for weighing the fluent material accumulated in the tube, means responsive to said scale means for discontinuing introduction of fluent material through said probe and for withdrawing said probe from the tube, dancer means upstream from said first holding means for festooning a length of tube equal substantially to an increment of the distance between said mandrel and said sealing means, second releasable tube holding means upstream from said dancer means normally released from the tube to accommodate festooning of the tube, means responsive to withdrawal of said probe from the tube for applying said second holding means and releasing said first holding means to accommodate feeding of the festooned length of tube toward the mandrel under the gravitational influence of the material in the filled end of the tube, whereby a hole through which the probe passed is disposed adjacent said sealing means, said sealing means including means for forming a seal transversely of the tube both above and below said hole, and means for severing the tube between said seals across the hole.

29. Container forming and filling apparatus comprising: a hollow mandrel having a hole therein; means above said mandrel for guiding a tube of container material downwardly about said mandrel; means below said mandrel for sealing the tube transversely of its length comprising a pair of relatively reciprocable members movable toward and away from one another and including a pair of opposed jaws for grasping the tube therebetween, two vertically spaced pairs of sealing bars engageable with the tube for sealing the upper end of one container and the lower end of the next container, and cut-off means between the latter two pairs of bars for severing the tube between the two seals; a filling probe juxtaposed to the hole in said mandrel; means for moving said probe into and out of said hole through the container material disposed about said mandrel; means for introducing fluent material through said probe into the mandrel and the tube; first releasable tube holding means upstream from said mandrel in the direction of tube movement normally preventing downward movement of the tube about said mandrel and accommodating gravity filling of portions of the tube below the mandrel; dancer means upstream from said first holding means for festooning a length of tube equal substantially to an increment of the distance between said mandrel and said sealing means; second releasable tube holding means upstream from said dancer means normally released from the tube to accommodate festooning of the tube; and means responsive to removal of said probe from the tube and mandrel for moving the sealing members away from the tubing, for applying said second holding means and for releasing said first holding means to accommodate gravitational descent of the filled lower end of the tube and consequently feeding of the festooned length of tube toward the mandrel, whereby a hole through which the probe passed is disposed adjacent said sealing means for sealing the tube both above and below the probe hole when the sealing means again engages the tube.

30. Container forming and filling apparatus comprising a hollow mandrel having a hole therein; means above said mandrel for guiding a tube of container material downwardly about said mandrel; means below said mandrel for sealing the tube off into individual packages, comprising a pair of members mounted for conjoint vertical movement and for relative reciprocation toward and away from one another from opposite sides of the tube, a pair of opposed tube grasping jaws on said members, two vertically separated pairs of sealing bars on said members above said jaws, cut-off means between said two pairs of bars, a pair of box forming elements on said members above said bars, and means for moving said members initially to close the same on the tube to seal the lower end of the tube and enclose it in the box forming elements and then to raise the lower end of the tube toward said mandrel to introduce slack into the portion of the tube between said sealing means and said mandrel; a filling probe juxtaposed to the hole in said mandrel; means for moving said probe into and out of said hole through the container material disposed about said mandrel; means for forcibly pumping fluent material through said probe into the mandrel and the tube; means responsive to removal of said probe from the tube and mandrel for relatively advancing the tube with respect to said mandrel, probe and sealing means; said means for moving said sealing members being responsive to the last-named means to separate said sealing members from the tube and accommodate passage therebetween of the filled lower end of the tube, whereby a hole through which the probe passed is disposed adjacent said sealing means, said means for moving said sealing members then lowering the sealing members and moving them back into engagement with the tube for forming seals transversely of the tube and for severing the tube between said seals.

31. Container forming and filling apparatus as set forth in claim 30, including a common frame for said mandrel, said sealing means and said filling probe, scale means supporting said frame for weighing the fluent material accumulating in the tube, and means responsive to said scale means for discontinuing introduction of fluent material through said probe and for withdrawing said probe from the tube; said moving means for said sealing means including means for releasing a completed container prior to completion of filling of the next increment of tube to be filled, whereby each increment is filled with a predetermined weight of fluent material.

32. Container forming and filling apparatus as set forth in claim 30, wherein said means for relatively advancing the tube upon each operation thereof relatively advances the tube a fraction of the distance between said mandrel and said sealing means, and means between said mandrel and said sealing means for closing the hole in the tube through which the probe passed during the preceding operation of the apparatus.

33. Container forming and filling apparatus as set forth in claim 30, including means responsive to predetermined pumping of fluent material into the tube for raising said mandrel above said probe, means comprising cooperable elements disposed to opposite sides of the mandrel with one element surrounding said probe for sealing the tube about the probe hole when the mandrel is raised above the probe, and means responsive to the last-named means for retracting the same and said probe from the tube and for initiating relative advancing of the tube.

34. Container forming and filling apparatus as set forth in claim 30, wherein said means for relatively advancing the tube causes each portion of the tube probed by said probe to be disposed opposite said sealing means, and said sealing means seals the tube transversely thereof above and below each probe hole and severs the tube across the hole.

35. In container forming and filling apparatus as set forth in claim 20, said pairs of sealing bars each comprising a sealing member and a resilient backing member between which the tube is confined, said sealing member being forcibly pressed toward said resilient backing member for squeezing fluent material within the tube out of the area engaged by said sealing member to facilitate formation of an effective seal.

36. In container forming and filling apparatus as set forth in claim 20, said cut-off means comprising an electrically heated cut-off member and a resilient backing member between which members the tube is confined, said cut-off member comprising an electrically heated element and a protective cover therefor, said cut-off member being pressed firmly against the tube and said backing member to squeeze fluent material within the tube out of the area of said heated element to facilitate cutting of the tube.

37. In container forming and filling apparatus as set forth in claim 36, said heated element being energized at high voltage for a short period of time subsequent to engagement of the cutting member with the tubing whereby the cutting member melts through the tubing and forms bead seals at the upper end of the one container and the lower end of the next container reinforcing the seals made by said pairs of sealing bars.

38. In container forming and filling apparatus wherein fluent material is introduced into a relatively elevated portion of a vertically disposed length of continuous flexible tubing, a pair of members adjacent the lower end portion of the tubing mounted for conjoint vertical movement and for relative reciprocation toward and away from one another from opposite sides of the tubing, and means for moving said members toward the tubing to close the same on the tubing and thereby seal the lower end thereof and for then raising said members and the lower end of the tubing for introducing slack into the tubing to facilitate filling of the lower end portion thereof.

39. A process of forming and filling flexible containers comprising: drawing flexible tubular container material about a mandrel disposed in the tube; sealing the tube at a first portion thereof downstream from the mandrel; inserting a filling probe through a second portion of the tube and the mandrel, and directing fluent material through the probe in to the tube, relatively moving said first portion of the tube toward the mandrel to introduce slack into the tube to facilitate filling of said first portion of the tube with the fluent material; withdrawing the probe from the tube; relatively moving the tube with respect to the probe, mandrel and sealing means; and sealing said tube adjacent said second portion thereof.

40. Container forming and filling apparatus comprising a hollow mandrel, means for guiding a tube of container material about said mandrel, means downstream from said mandrel for sealing the tube transversely of its length, a hole in said mandrel, a filling probe juxtaposed to said hole, means for moving said probe into and out of said hole through the container material disposed about said mandrel, means for introducing fluent material via said probe and mandrel into the portion of the tube adjacent said sealing means, means responsive to removal of said probe from the tube and mandrel for relatively advancing a predetermined length of tube toward the mandrel, which length of tube is less than the distance between said mandrel and said sealing means, and means between said sealing means and said mandrel spaced downstream from said mandrel by a distance equal to said predetermined length of tube for closing the probe hole previously made in the tube.

41. Container forming and filling apparatus as set forth in claim 40, wherein said means for closing the probe hole comprises sealing elements disposed to opposite sides of the tubing and adapted for engagement therewith to seal the tubing to itself in encircling relation to the probe hole.

42. Container forming and filling apparatus as set forth in claim 40, wherein said means for closing the probe hole comprises a supply of patching material, and means for applying a patch over the area of the tubing within which the probe hole is located.

43. Container forming and filling apparatus as set forth in claim 42, wherein said patch applying means includes a mandrel spaced downstream from the first-named mandrel over which the tube is guided for opening the tube and facilitating application thereto of the patch.

44. A process of continuously forming and filling flexible containers comprising drawing a length of flexible tubular container material about a mandrel formed with a passage therethrough disposed within the tube, sealing the tube at a portion thereof downstream from the mandrel in the direction of tube movement, inserting a filling probe through the container material and into the mandrel passage, directing a fluent material through the probe into the tube, withdrawing the probe from the mandrel and the tube, and applying a patch over the probe hole in the tube.

45. A process of continuously forming and filling flexible containers comprising: intermittently disposing a predetermined length of flexible tubular container material about a mandrel formed with a passage therethrough disposed within the tube; while movement of the tube is relatively arrested for a first time, sealing the tube at a first portion thereof downstream from the mandrel, inserting a filling probe through a second portion of the tube and into the mandrel passage; directing fluent material through the probe into the tube, and withdrawing the probe from the mandrel and the tube; while movement of the tube is relatively arrested for a second time, applying a patch over the probe hole in said second portion of the tube, sealing the tube at a third portion thereof intermediate said first and second portions, and repeating the filling operation at a fourth portion of the tube; and while movement of the tube is relatively arrested for a third time, applying a patch over the probe hole in said fourth portion of the tube, sealing the tube adjacent said second portion thereof, and repeating the filling operation at a fifth portion thereof.

46. A process of continuously forming and filling flexible containers comprising: intermittently disposing successive portions of flexible tubular container material each of a predetermined length about a first mandrel formed with a passage therethrough and about a second mandrel spaced from the first mandrel by a distance equal to said predetermined length; while movement of the tube is relatively arrested for a first time, sealing the tube at a first portion thereof downstream from the second mandrel, inserting a filling probe through a second portion of the tube and into the first mandrel passage, directing fluent material through the probe into the tube, and withdrawing the probe from the first mandrel and the tube; while movement of the tube is relatively arrested for a second time, applying a patch over the probe hole in said second portion of the tube as said second portion of the tube is supported by said second mandrel, sealing the tube at a third portion thereof downstream from said second mandrel and intermediate said first and second portions, and repeating the filling operation at a fourth portion of the tube; and while movement of the tube is relatively arrested for a third time, applying a patch over the probe hole in said fourth portion of the tube as the fourth portion of the tube is supported by said second portion thereof, and repeating the filling operation at a fifth portion thereof.

47. A process of continuously forming and filling flexible containers comprising: drawing flexible tubular material about a mandrel formed with a passage therethrough disposed in the tube; sealing the tube at a first portion thereof downstream from the mandrel, inserting a filling probe through a second portion of the tube and into the mandrel passage directing fluent material through the probe into the tube, simultaneously moving the mandrel, probe and tube downstream while directing fluent material through the probe into the tube, withdrawing the probe from the tube and moving the mandrel and probe upstream relative to the tube; sealing the tube adjacent said second portion thereof; and inserting the filling probe through a third portion of the tube and the mandrel.

48. Container forming and filling apparatus comprising a hollow mandrel, means for guiding a tube of container material about said mandrel, means downstream from said mandrel for sealing the tube, a hole in one wall of said mandrel, a filling probe juxtaposed to said hole, means for moving said probe into and out of said hole through the container material disposed about said mandrel, means for introducing fluent material through the probe into the tube, and means responsive to removal of the probe from the tube for relatively moving the probe, mandrel and sealing means upstream relative to the tube to dispose said sealing means adjacent a hole through which the probe passed.

49. Container forming and filling apparatus comprising a hollow mandrel, means above said mandrel for guiding a tube of container material downwardly about said mandrel, means below said mandrel for sealing the tube transversely of its length, a hole in said mandrel, a filling probe juxtaposed to said hole, means for moving said probe into and out of said hole through the container material disposed about said mandrel and for sealing the probe, tube and mandrel to one another, means for introducing fluent material through said probe into the mandrel and the tube, tube retarding means upstream from said mandrel in the direction of tube movement normally preventing downward movement of the tube about said mandrel, means for moving said probe, mandrel and sealing means downwardly and for conjointly moving the tube downwardly therewith against the retarding force of said retarding means for simultaneously moving and filling the tube, and means responsive to completion of filling of the tube for removing said probe from the tube and mandrel and for moving the probe, mandrel and sealing means upwardly relative to the tube to dispose said sealing means adjacent a hole in the tube through which the probe has passed, said sealing means including means for forming a seal about said hole.

References Cited
UNITED STATES PATENTS

| | | | |
|---|---|---|---|
| 1,588,647 | 6/1926 | Bates | 53—182 X |
| 2,387,812 | 10/1945 | Sonneborn et al. | 53—29 X |
| 2,612,738 | 10/1952 | Salfisberg | 53—29 |
| 2,616,232 | 11/1952 | Meyer | 53—191 X |
| 2,618,814 | 11/1952 | Paxton et al. | 53—192 X |
| 2,847,806 | 8/1958 | Wang | 53—29 |
| 2,852,898 | 9/1958 | Berg | 53—182 |
| 2,861,406 | 11/1958 | Holsman et al. | 53—29 |
| 2,999,532 | 9/1961 | Bursak | 53—182 X |
| 3,055,154 | 9/1962 | Markley et al. | 53—182 |
| 3,070,927 | 1/1963 | Lundahl | 53—180 X |

GRANVILLE Y. CUSTER, Jr., *Primary Examiner.*